US006679970B2

(12) United States Patent
Hwang

(10) Patent No.: US 6,679,970 B2
(45) Date of Patent: Jan. 20, 2004

(54) STRUCTURE FOR PREVENTING THE EMBEZZLEMENT AND THE SEE-THROUGH OF THE PREPAYMENT CARD

(76) Inventor: Jong-Bae Hwang, 107-1604, Sungwon Apt., Kuwoon-dong, Kwonsun-ku, Suwon-city, Kyungki-do (KR)

( * ) Notice: Subject to any disclaimer, the term of this patent is extended or adjusted under 35 U.S.C. 154(b) by 86 days.

(21) Appl. No.: 10/050,788

(22) Filed: Jan. 18, 2002

(65) Prior Publication Data

US 2003/0029557 A1 Feb. 13, 2003

(30) Foreign Application Priority Data

Aug. 10, 2001 (KR) ........................................ 2001-48206
Sep. 10, 2001 (KR) ........................................ 2001-55459
Oct. 23, 2001 (KR) ........................................ 2001-65296

(51) Int. Cl.$^7$ .......................... B32B 31/00; B42D 15/10

(52) U.S. Cl. ....................... 156/277; 156/250; 156/252; 156/256; 156/257; 283/101; 283/103; 283/105

(58) Field of Search ................................ 156/250, 252, 156/256, 257, 277, 247; 283/72, 100, 101, 103, 105, 903

(56) References Cited

U.S. PATENT DOCUMENTS 4,863,196 A * 9/1989 Ohnishi et al. ............... 283/82
5,777,305 A * 7/1998 Smith et al. ................ 235/380
5,839,763 A * 11/1998 McCannel .................. 283/109
5,842,629 A * 12/1998 Sprague et al. ............... 229/71
6,358,607 B1 * 3/2002 Grotzner et al. ............ 428/354
6,439,613 B2 * 8/2002 Klure .......................... 283/62
6,543,809 B1 * 4/2003 Kistner et al. ................ 283/57
2003/0059565 A1 * 3/2003 Otaki et al. ................ 428/40.1
2003/0059592 A1 * 3/2003 Jarvis et al. ................ 428/212

FOREIGN PATENT DOCUMENTS

JP 8-249434 * 9/1996

* cited by examiner

*Primary Examiner*—Curtis Mayes
(74) *Attorney, Agent, or Firm*—Robert E. Bushnell, Esq.

(57) ABSTRACT

A technique for preventing unauthorized access to a hidden code on a prepaid telephone card. A technique for preventing an undetected access to a hidden number or code on a lottery ticket, prepaid telephone card, game piece, or other type of item. A structure is provided to prevent the embezzlement and viewing of the hidden number on a prepaid card by attaching an opaque film label over the hidden number to conceal the hidden number, attaching a holographic image over the film label, and attaching a transparent film over the holographic image. The transparent film, holographic image, and film label must be removed in order to view the hidden code. When the transparent film, holographic image, and film label are removed, certain marks are left on the card which clearly demonstrate that the hidden number has been accessed.

15 Claims, 26 Drawing Sheets

STRUCTURE FOR PREVENTING THE EMBEZZLEMENT AND THE SEE-THROUGH OF THE PREPAYMENT CARD

CLAIM OF PRIORITY

This application makes references to, incorporates the same herein, and claims all benefits accruing under 35 U.S.C. §119 from my three applications 1) STRUCTURE FOR EMBEZZLE PREVENTION A USING HOLOGRAM TYPE SELF DESTROY THE ADVANCED PAYMENT CARD filed with the Korean Industrial Property Office on Aug. 10, 2001 and there duly assigned Ser. No. 48206/2001; 2) STRUCTURE FOR EMBEZZLE PREVENTION A USING HOLOGRAM TYPE SELF DESTROY THE ADVANCED PAYMENT CARD filed with the Korean Industrial Property Office on Sep. 10, 2001 and there duly assigned Ser. No. 55459/2001; and 3) STRUCTURE FOR SEEING THROUGH PREVENTION A USING DUMMY NUMBER THE ADVANCED PAYMENT CARD filed with the Korean Industrial Property Office on Oct. 23, 2001 and there duly assigned Ser. No. 65296/2001.

BACKGROUND OF THE INVENTION

1. Technical Field

The present invention relates to a technique for preventing theft of information concealed on a card, and more particularly relates to a technique for preventing undetected access to information concealed on a card such as a lottery card or a prepaid telephone card.

2. Related Art

A prepaid telephone card often conceals a special code. Similarly, a lottery ticket, a game piece, and other types of items can conceal a special code. This type of special code is meant to be seen by the purchaser of the card. This type of special code is not meant to be seen by someone who does not purchase the card.

For example, the manufacturer of a prepaid telephone card typically wants to keep the special code hidden from view, until the prepaid telephone card is purchased. A prepaid telephone card can be purchased in many retail stores today. The car d can have a special code that is hidden on the card beneath a silvery material. A person who purchases the card can scratch off the silvery material covering the special code, and then use that special code to make long distance or local telephone calls. The prepaid telephone card can allow a purchaser to use a cellular telephone for a predetermined number of minutes, for example.

The special code corresponds to a prepaid account with a predetermined amount of funds. When a number of phone calls are made, and the funds in the prepaid account are exhausted, then the card and the special code are worthless. After the purchaser scratches off the material covering the special code, the card has silvery scratch marks on it. Because of the obvious scratch marks, the purchaser would not be able to return the card to the store and get a full refund, because the store owner would know that the special code has been accessed.

With some types of cards, the funds in the prepaid account can be utilized even without physical possession of the card, once the special code is known. When a store owner sees that a prepaid telephone card has silvery scratch marks on it, the store owner would probably presume that the funds in the prepaid account had been depleted. The store owner would probably refuse to give a refund to a person trying to return a prepaid telephone card with silvery scratch marks on it.

A professional thief might be able to access the special code on a prepaid telephone card without leaving the silvery scratch marks. A professional thief might be able to purchase a prepaid telephone card, access the special code in an undetectable manner, and then return the card to the store for a full refund, because the card did not have silvery scratch marks. The professional thief could make long distance telephone calls using the special code and thereby deplete the funds in the prepaid account. After the professional thief returned the card, nobody else would know that the special code was worthless. An innocent person would go to that store and purchase that same prepaid telephone card. That innocent person would scratch off the silvery material, and then soon find out that the special code was worthless. That innocent person might then think that the telephone company that issued the prepaid card was incompetent, or might think that the store owner was dishonest, and might have trouble getting a refund for the prepaid telephone card.

A professional thief might be able to access the special code in an undetectable manner by heating the card to a predetermined temperature, carefully removing the silvery material from the card, reading the special code, and then replacing the silvery material over the special code on the card. A professional thief might be able to access the special code in an undetectable manner by shining a bright light through the card, and then reading the special code.

A similar type of special code can be concealed on a lottery ticket. In the case of a lottery ticket, the special code might correspond to lottery numbers. The lottery numbers might be winning lottery ticket numbers, or the lottery numbers might not be winning lottery ticket numbers. The professional thief can observe the numbers to see if the lottery ticket is a winning lottery ticket and then return the ticket to the store for a full refund if the lottery ticket is not a winning lottery ticket.

A special code can be concealed on a game piece. For example, a fast food restaurant might give out a free game piece with every purchase of a large soft drink. The game piece can have a special code hidden under a silvery material. The silvery material can be scratched off using a coin or a fingernail, for example. The special code might indicate that the person holding the card won a big prize, such as "YOU WIN AN AUTOMOBILE." Or the special code might indicate that the person holding the card won a small prize, such as "YOU WIN ONE HAMBURGER." Or the special code might indicate that the person holding the card did not win anything, by stating "YOU LOSE, PLEASE TRY AGAIN".

A professional thief may be part of an organization that accesses boxes of prepaid telephone cards, boxes of lottery tickets, or boxes of game pieces before those boxes arrive at any retail store.

I have found that it would be advantageous to improve the method of concealing the special code on cards, tickets, pieces, and other items, and I have found that it would be advantageous to prevent the theft of such special codes. It would be beneficial to conceal such a special code in a manner that prevented undetectable access to the special code. It would be desirable to prevent a thief from accessing the special code and then disguising the card so that a future purchaser was unaware that the special code had been previously accessed.

SUMMARY OF THE INVENTION

To solve the above-described problems, it is an object of the present invention to provide a structure preventing theft of special codes from cards, tickets, pieces, and other items. The present invention can prevent an undetected access to the special code. The present invention can prevent the undetected access to the special code by various methods.

It is an object of the present invention to provide a structure for preventing the embezzlement of the prepayment card. The structure has a transparent film with a predetermined pattern attached to its one side so that it can stick to the rear face of the prepayment card on which the identification number is printed. A mark remains on the card or film when the transparent film is removed by a dishonest means, thereby preventing the prepayment card(or lottery ticket) from being sold after the identification number has been seen (or revealed), and thus preventing improper commercial transactions.

In addition, it is an object of the present invention to provide a structure for preventing the theft of information from the prepayment card. The structure has a film which is processed to have an irregular wave-shape and a handle, with the film being attached to the face of the prepayment card, with the card having an identification number, with a self destructive hologram being attached strongly by bonding material so that it is possible that a a visible or detectable mark remains on the card after the identification number is viewed. Thus the prepayment card is prevented from being recovered to its original state after the identification number is viewed. In this way, the present invention prevents the prepayment card with a reattached film label from being sold, and protects customers since every one can recognize that the information on the card has already been accessed.

And, it is another object of the present invention to provide a structure for preventing the viewing of the special code of the prepayment card, in order to avoid improper commercial transactions in advance, by not allowing the card to be sold once, viewed, and then sold again.

The present invention is intended to solve problems associated with the following issues. If the user pays an amount of money to the communication company (the wired and wireless communication company), the communication company provides the user with the telephone card electrically credited by an amount corresponding to the pre-paid money, and then the user can use a pay telephone for calls within the limits of the pre-paid money. The printed number or drawings for identifying “a winner” or “a loser” on a lottery ticket and the printed identification number on a prepayment card are discovered by a scratching method. In order to prevent the number from being flown out (viewed), generally a label which is sealed by thick ink to prevent see-through viewing is attached on the number. But in the use of such a scratch label, the identification number is easily flown out (seen) by a professional embezzlement group. For example, under the condition of a specific temperature the label can be separated by sharp knife to allow confirmation of win/loss of lottery ticket and to allow a recognition of an identification number, and under the condition of high luminance light the number can be seen. Thus it is possible that a lottery ticket or card can viewed without being distorted, so groups of professional criminals reselling cards has been organized to cause massive financial damage and to cause severe damage to the reputation of innocent companies. And in the case of a lottery ticket, after confirmation of win/loss by carful viewing, it is kept if it is a winner or it is restored in order to resell it if it is a loser. Until now, a card had a black bottom surface and a white upper surface, and a black identification number was printed on the White upper surface and then covered with a silver-colored material. The silver-colored material was peeled using a scratching method to view the upper surface of the card to see the identification number. That is, the structure for preventing the disclosure of the existing card identification number could have prevented the seeing through with the naked eye from the outsider, as the label or silver-colored material is attached to the upper surface of the card. But, the method as said above can allow the identification number of the card to be viewed easily by the professional embezzlement organization. That is, the density of the black bottom surface is different from the density of the black identification numbers, and the density of the silver-colored material is different from the densities of the black bottom surface and the black identification numbers. If the specialist has seen through the card with a very bright light of high intensity and thus made use of such special light or instrument, the outlines of each of the printing faces having the different densities will have been visible clearly. Due to such density differences and defects of design, theft and embezzlement have happened frequently. Therefore, after the embezzlement has happened so that the identification number of the prepayment card is disclosed by the professional crime organization, the user to purchases the card with a sum of money paid by fair means, and the user is the victim since the identification number was previously accessed. Also, the telecommunication company selling the prepayment card has lost the confidence of the consumer as the company’s image has been damaged by the prepayment card’s embezzlement by the professional crime organization. Therefore, the problem is that both the good citizen and the telecommunication company have been damaged very much.

To achieve these and other objects in accordance with the principles of the present invention, as embodied and broadly described, the present invention provides a method, comprising: forming a first adhesive layer between a front surface of a card and a rear surface of a portion bearing a holographic image, the card bearing an identification number, the portion bearing the holographic image being adhered to the card to cover the identification number; forming a removable tape separation handle at an edge of the card, the tape separation handle being connected to the card by a plurality of curved projections, the tape separation handle being removed from the card when the curved projections are cut; and forming a second adhesive layer between a transparent film and a front surface of the portion bearing the holographic image, the second adhesive layer being formed to display at least one mark when the transparent film is separated from the portion bearing the holographic image.

To achieve these and other objects in accordance with the principles of the present invention, as embodied and broadly described, the present invention provides a method, comprising: forming a first adhesive layer between a front surface of a card and a rear surface of unit bearing a holographic image, the card bearing an identification number, the unit bearing the holographic image being adhered to the card to cover the identification number; forming a removable tape separation handle at an edge of the card, the tape separation handle being connected to the card by a plurality of curved projections, the tape separation handle being removed from the card when the curved projections are cut; and forming an additional adhesive layer between a transparent film and a front surface of the unit bearing the holographic image, the adhesive layer adhering to and removing a part of the unit bearing the holographic image when the transparent film is at least partially separated from the unit bearing the holographic image.

To achieve these and other objects in accordance with the principles of the present invention, as embodied and broadly described, the present invention provides a method, comprising: applying an adhesive to a first portion of a film label and not applying the adhesive to a label separation handle portion of the film label; attaching the first portion of the film label over a number printing layer on a card with the adhesive, the number printing layer bearing an identification number, the film label being substantially opaque to prevent viewing of the identification number through the film label, the film label having tooth-shaped regions on at least two edges of the film label; and attaching a unit bearing a holographic image over the film label, the unit having a first part attached to the film label and having a second part attached to the card, the second part extending beyond at least one edge of the film label, the second part being separated from the first part and having tooth-shaped edges when the film label is removed from the number printing layer.

To achieve these and other objects in accordance with the principles of the present invention, as embodied and broadly described, the present invention provides a method, comprising: forming a first handle at an edge of a card, the first handle being connected to the card by a plurality of projections, the first handle being removed from the card when the projections are cut; attaching a film label to a card to cover a number printing layer on the card, the number printing layer bearing an identification number, the film label having a label separation section adjacent to the first handle and having a tooth portion adjacent to the number printing layer; and displaying at least one mark adjacent to the number printing layer at a location corresponding to the tooth portion when the film label is separated from the card.

To achieve these and other objects in accordance with the principles of the present invention, as embodied and broadly described, the present invention provides a method, comprising: attaching a predetermined unit over a number printing layer on a card, the predetermined unit having an opaque layer adjacent to the number printing layer, the number printing layer bearing a true identification number, the opaque layer blocking viewing of the true identification number when the predetermined unit is attached on the card, the predetermined unit bearing a false identification number different from the true identification number; and attaching a portion bearing a holographic image over the predetermined unit, the portion bearing the holographic image having a first part attached to the predetermined unit and having a second part not attached to the predetermined unit, the second part extending beyond at least one edge of the predetermined unit, the second part being separated from the first part and having at least one jagged edge when the predetermined unit is separated from the card to access the true identification number.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENTS

Figure 1:
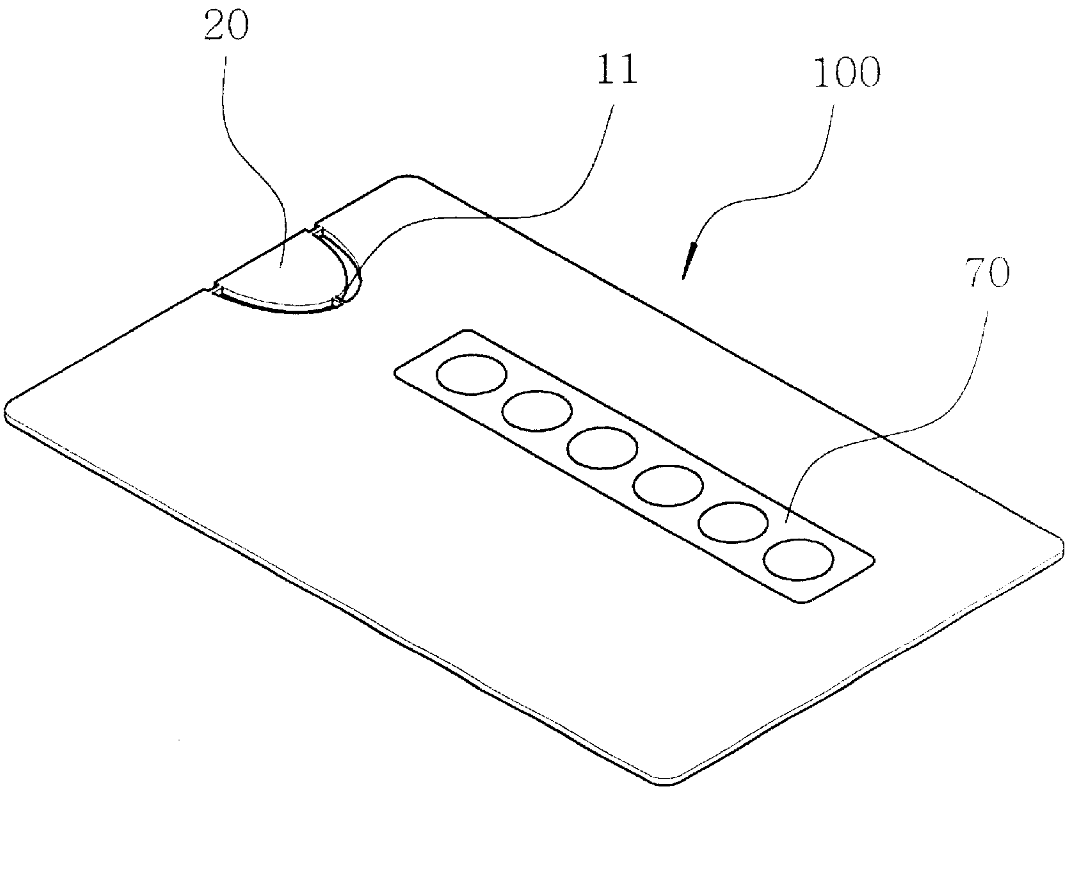
FIG. 1 shows a perspective view showing the structure of the prepayment card for preventing embezzlement and theft, according to the first embodiment of the present invention.

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure. Additionally, the embodiments disclosed can be combined.

The FIGS. 1–26 show views of embodiments, in accordance with the principles of the present invention. The present invention can prevent an undetected access to a special code that is hidden on a card. The special code can also be described as a card identification number. The present invention can prevent the undetected access to the special code by various methods. For example, a card can be formed to have tape separation handle on one edge, so that the handle breaks off when a person tries to remove a film covering the special code in order to try to view the special code. Also, a card can be formed to have a plastic part covering the special code. The plastic part can have a holographic image. When a person tries to remove the plastic part in order to view the special code, the plastic part breaks away from the card, and the holographic image is permanently altered.

If someone tried to put the plastic part back into place over the special code,it would be obvious that the holographic image has been tampered with. The holographic image would be clearly and permanently altered. This type of holographic image can be described as a self-destructive type of holographic image. The holographic image and tape separation handle can be used together on a card. Furthermore, the aforementioned silvery material can be placed over the special code, and then the holographic image can be placed on top of the silvery material. The purchaser would need to break off the plastic part (permanently distorting the holographic image) and then scratch off the silvery material with a coin or a fingernail. Thus, in accordance with the principles of the present invention, there can be multiple methods used in conjunction with each other, in order to prevent undetected access to the special code on the card.

According to the principles of the present invention, the self destructive holographic image can show a first hologram of the word "VALID" when the special code has not yet been accessed, and then the self destructive holographic image can show a second hologram of the word "VOID" after the special code has been accessed. Or one of the two holograms can be a company's logo. Or the plastic part with holographic image can be blank until the special code is accessed, at which time the word "VOID" would become visible.

According to the principles of the present invention, the self destructive holographic image can display a holographic company logo when the special code has not yet been accessed, and then, later, after the special code has been accessed (and the holographic image portion has been bent off or cut off from the card), the company logo will no longer be visible.

A transparent film can be adhered onto the top of the holographic image portion using a second adhesive layer. If the transparent film is removed from the holographic image portion, a predetermined pattern will be visible, due to the permanent marks left because of the disturbed second adhesive layer. The predetermined pattern could be the word "VOID" or could be a letter or could be checkered pattern or could be another pattern.

Referring now to the drawings, the embodiments according to the present invention are described in detail. Referring to FIG. 1 through FIG. 4, the first embodiment of the present invention is as follows.

Figure 2:
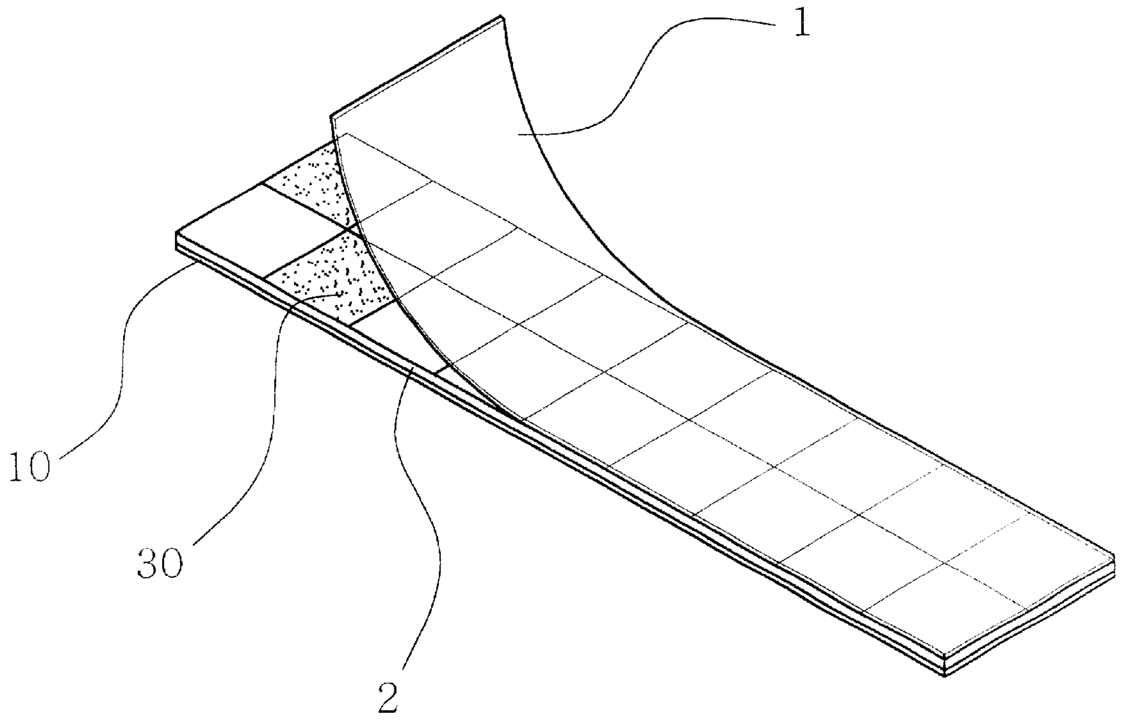
FIG. 2 shows a state view showing an application of the adhesives by the check pattern in one side of the self destructive type hologram according to the first embodiment of the present invention.
Figure 3:
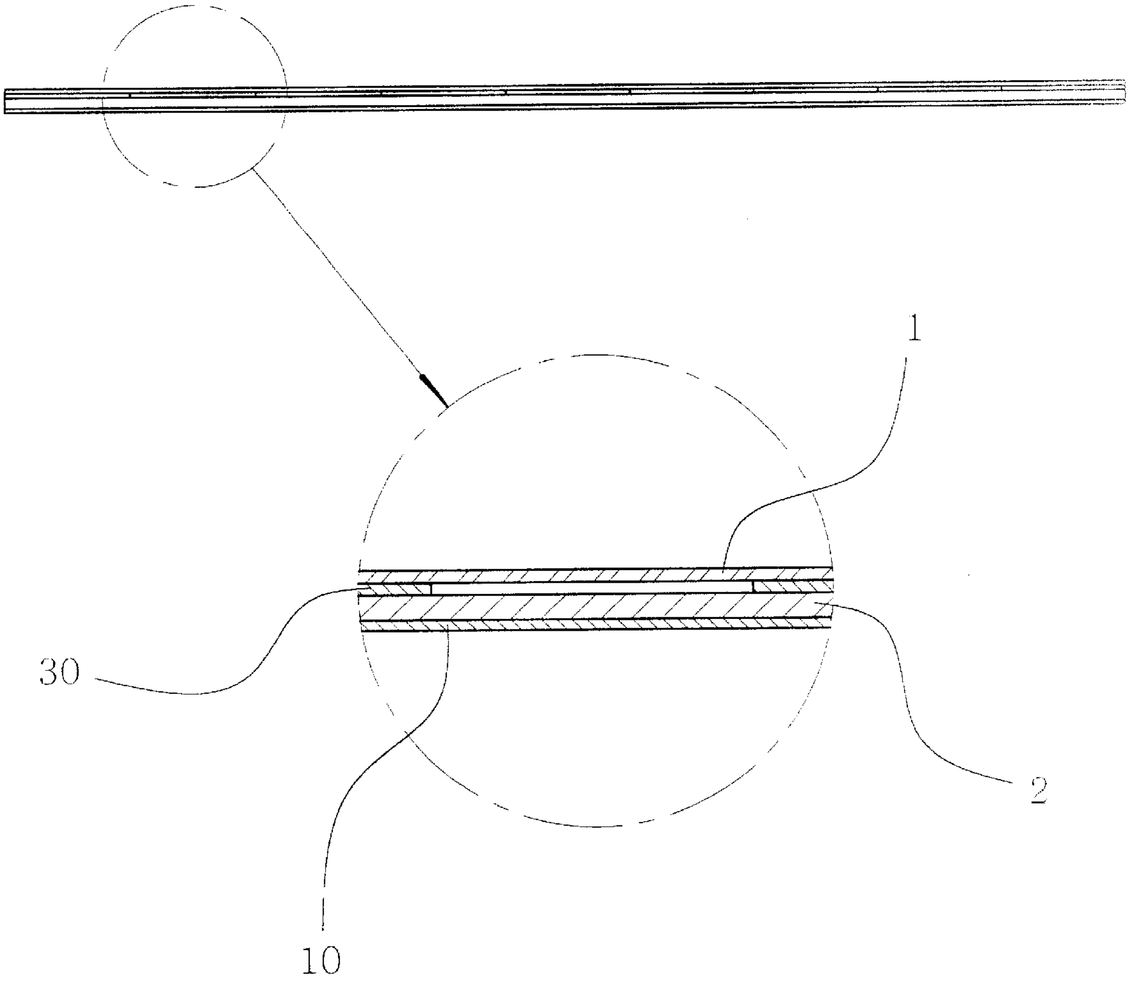
FIG. 3 shows a sectional view showing the structure for preventing the embezzlement of the prepayment card using the self destructive type hologram according to the first embodiment of the present invention.
Figure 4:
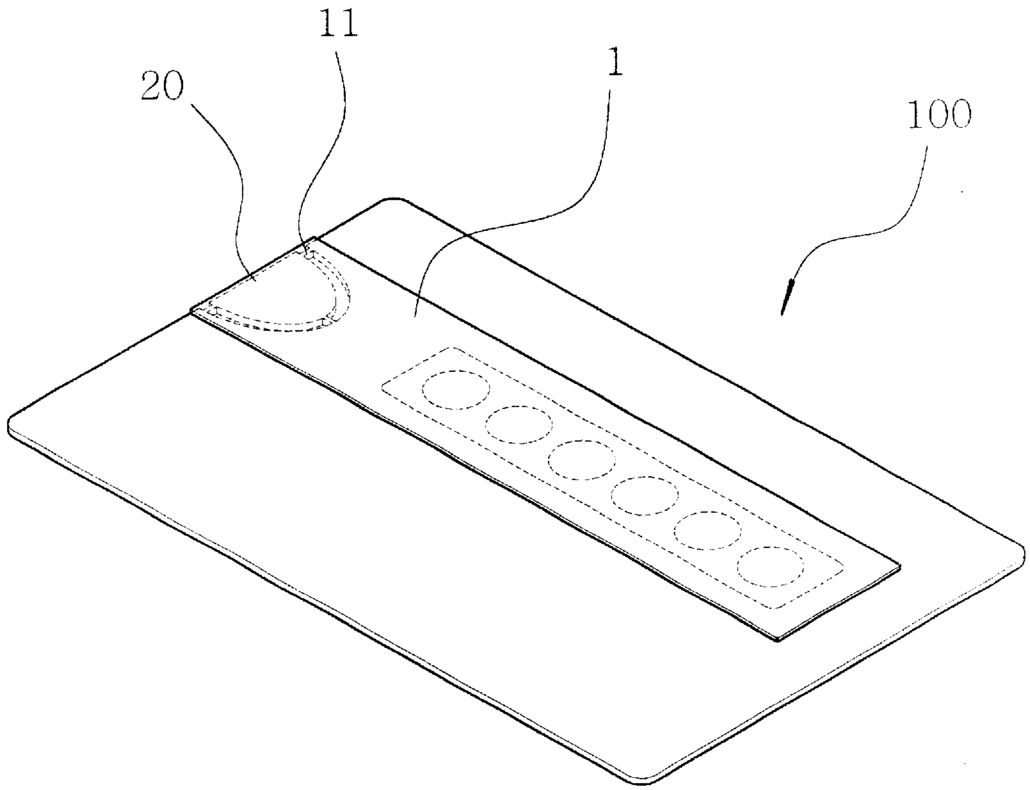
FIG. 4 shows a state view showing an attachment of the self destructive type hologram and the transparent film to the back of the prepayment card according to the first embodiment of the present invention.

FIG. 1 is a perspective view showing the structure of the prepayment card for preventing embezzlement according to the first embodiment of the present invention, FIG. 2 is a state view showing the adhesives with the check pattern to one side of the self destructive type hologram according to the first embodiment of the present invention, FIG. 3 is a sectional view showing the structure for preventing the embezzlement of the prepayment card using the self destructive type hologram according to the first embodiment of the present invention, FIG. 4 is a state view showing attaching the self destructive type hologram to the transparency film at the rear face of the prepayment card according to the first embodiment of the present invention.

As shown in FIG. 1 through FIG. 4, the card identification number is printed on the rear face of a prepayment card 100, and, thereafter, the self destructive type hologram 2 is attached, thereafter a transparency film 1 is attached on its surface so as to cover the number printing layer 70. The first adhesive layer 10 is attached to the rear of the prepayment card 100 and can be peeled with the scratching method to the entire bottom of the self destructive type hologram 2. A tape separation handle 20 is connected with a plurality of curved projections 11, and can be separated from the transparency film I by cutting of the plurality of curved projections 11. This structure allows a user to be notified that the prepayment card 100 was used. The handle 20 is formed on one side of the prepayment card 100. A second adhesive layer 30 is shaped into a predetermined pattern with a distance between the transparent film 1 and the self destructive hologram 2 in order to prevent the embezzlement of the card identification number in accordance with re-attachment of the transparent film 1, as traces of such separation will remain when the transparent film 1 is separated from the self destructive hologram 2.

Here, the applying pattern of the second adhesives layer 30 is adjusted so as to be come out as a checked-pattern, character, or letter when the transparent film 1 is separated from the self destructive type hologram 2.

Referring to the FIG. 1 through FIG. 4, the effect of the first embodiment of the present invention will be described in more detail as follows.

First, the first adhesive layer 10 is applied to the entire bottom of the self destructive type hologram 2 and a tape separation handle 20 is formed to one side of the prepayment card 100. The handle 20 is connected with a plurality of curved projections 11 and can be separated by cutting the plurality of curved projections 11.

Next, the second adhesive layer 30 is formed to the plane of self destructive hologram 2 with a distance so as to come out as a predetermined pattern thereafter, the transparent film is attached to the surface of the self destructive hologram 2 on which the second adhesive layer 30 is formed.

And, when the self destructive type hologram 2 is attached to the printing layer 70 of card identification number at the rear face of the prepayment card 100, where the identification number is printed, the self destructive type hologram 2 is attached strongly to card 100 by the first adhesive layer 10 applied to the entire bottom of the hologram 2.

At this time, when the user would like to see the identification number on the rear face of the prepayment card 100 after the user purchases the prepayment card 100, first of all the user swings the tape separation handle 20 up and down. This repeated up-and-down movement will eventually break the curved projections 11.

Thus, the curved projections 11 of the tape separation handle 20 would be broken or cut by the swing of the tape separation handle 20. Then if the user pulls out the tape separation handle 20 after breaking the curved projections 11, both the tape separation handle 20 and the transparent film 1 are separated from the self destructive hologram 2.

At this time, the second adhesive layer 30 is formed into a predetermined pattern with a distance between the self destructive type hologram 2 and the transparency film 1. A loosening phenomenon occurs along the transparency film when the second adhesive layer 30 having a sticking property is separated from the transparency film 1. Thus, a predetermined shape is revealed by the applied pattern so as to allow a user to recognize, directly with his eye, the surface of the self destructive hologram 2. As shown in the first embodiment of the present invention, even when the check pattern is utilized, the character pattern or the alphabet pattern can also be utilized in the present invention.

After that, if the user peels the self destructive type hologram 2 by the scratching method using the finger or the coin, the identification number as printed on the number printing layer 70 of the prepayment card 100 can be recognized after the peeling of the self destructive type hologram 2.

Here, if the transparency film 1 is separated from the self destructive type hologram 2 once, the designated pattern comes out to the surface of the self destructive type hologram 2 due to the loosening phenomenon of the second adhesive layer 30 as applied into the designated pattern between the transparency film and the self destructive type hologram 2. If a user tried to attach the transparency film 1 again after having separated the transparency film 1 once, the designated pattern of the second adhesive layer 30 as revealed would allow everyone to recognize easily the fact that the number on the card 100 has been viewed previously. Thus, a sale of the card 100 can be prevented after the card identification number of the prepayment card 100 has been revealed.

In addition, the separation of the transparent film 1 is accomplished by the tape separation handle 20 connected with a plurality of curved projections 11 at one side of the prepayment card 100. Therefore, it is possible to identify whether the prepayment card 100 is used or not from the cutting out of a plurality of curved projections 11. Thus, the present invention can prevent effectively a double sale of the prepayment card 100.

That is, if the self destructive hologram label is attached on the identification number because the hologram itself is formed into a thin metal layer, it is impossible to see through by X-ray or high luminous light, and it is impossible to recover the original hologram once it has been modified by any means. Therefore, the present invention prevents the prepayment card 100 from being placed for sale twice.

Figure 5:
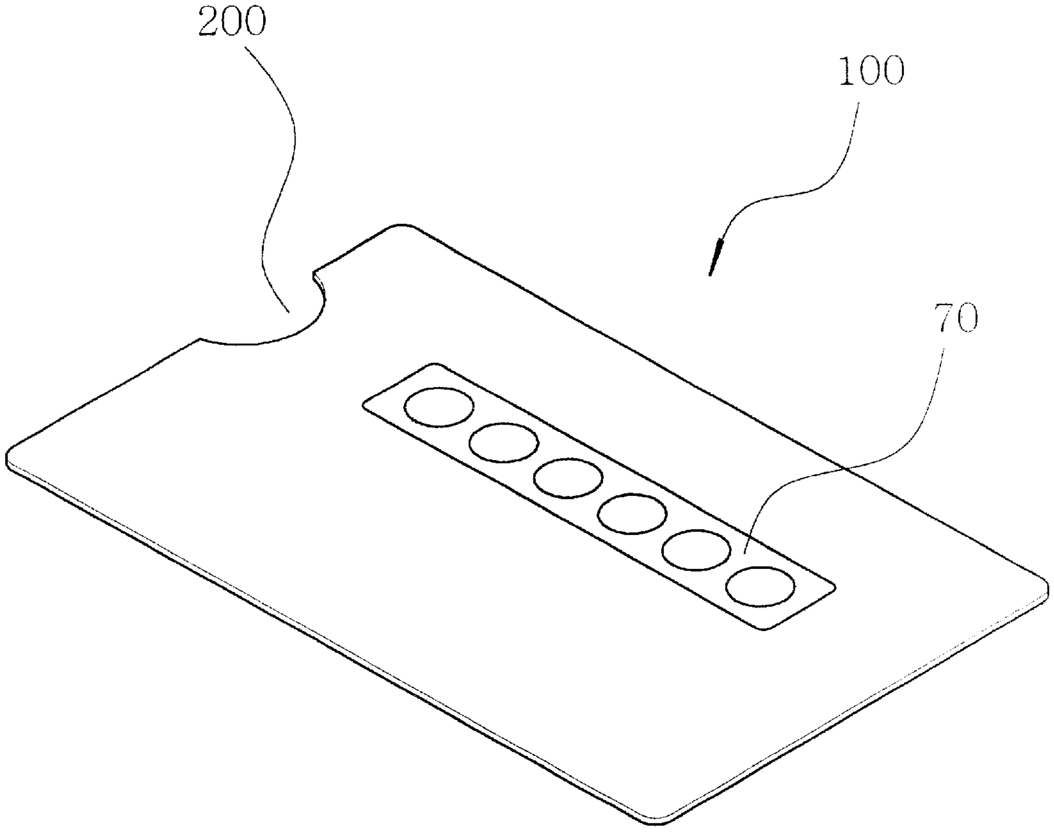
FIG. 5 shows a perspective view showing the structure of the prepayment card according to the second embodiment of the present invention.
Figure 6:
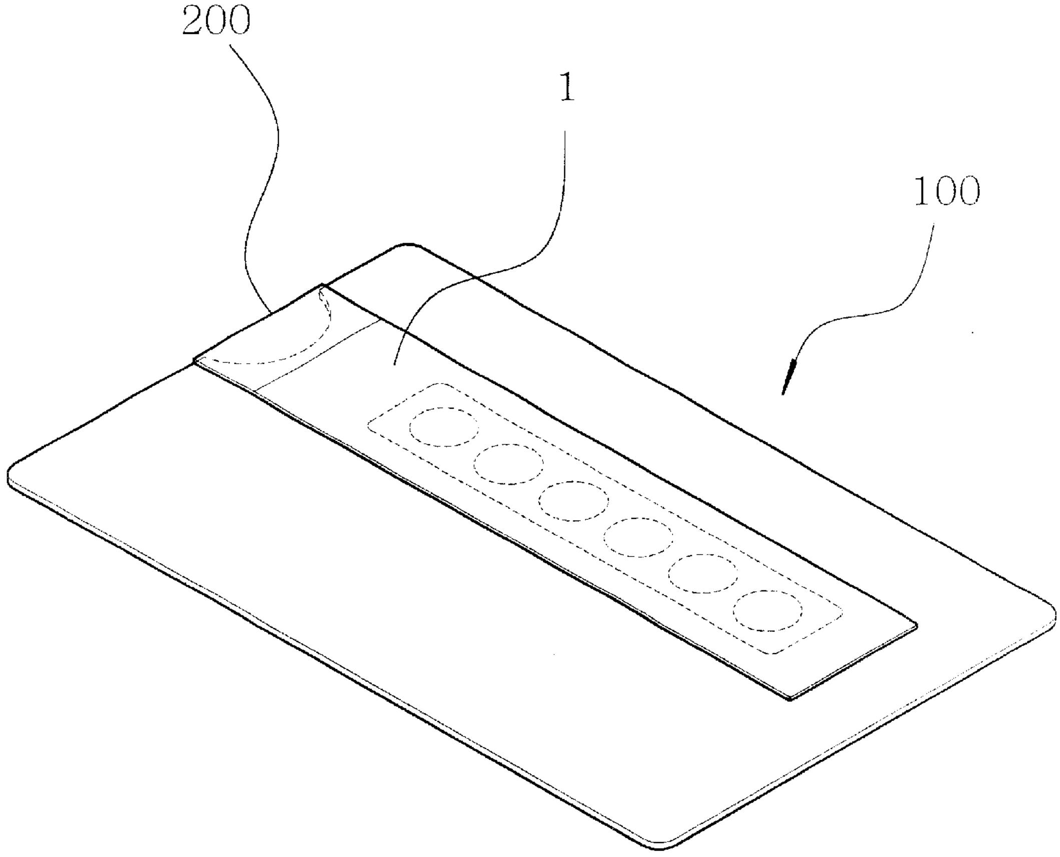
FIG. 6 shows a state view showing an attachment of the self destructive type hologram and the transparent film to the prepayment card of the FIG. 5 according to the second embodiment of the present invention.
Figure 7:
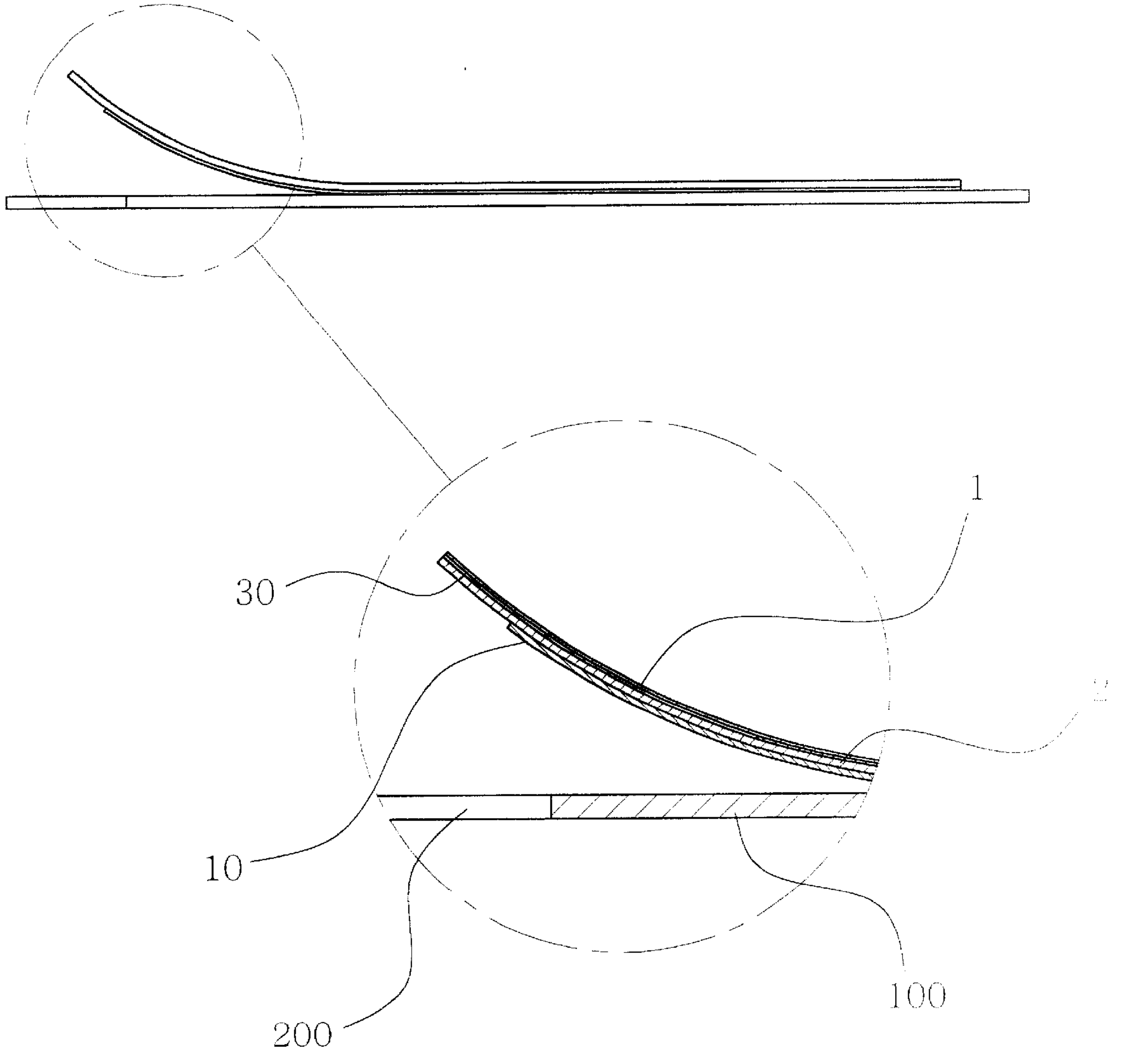
FIG. 7 shows a state view showing a division of the transparent film attached to the prepayment card according to the second embodiment of the present invention.

On the other hand, FIG. 5 shows a perspective view showing the structure of the prepayment card according to the second embodiment of the present invention, FIG. 6 shows a state view showing an attachment of the self destructive type hologram and the transparency film in the prepayment card as shown the FIG. 5 according to the second embodiment of the present invention, FIG. 7 shows a state view showing a division of the transparency film attached to the prepayment card according to the second embodiment of the present invention.

As shown in FIG. 5 through FIG. 7 according to the second embodiment of the present invention, there is a cutting part 200 having the curved shape the same as the last joint of a finger situated to one side of the prepayment card 100, and it is covered by the transparent film 1 which also covers the self destructive type hologram 2. If the user has caught and pulled out the transparent film 1 which is situated on the cutting part 200, the transparency film 1 is separated from the self destructive hologram 2 more easily.

That is, FIG. 5 through FIG. 7 show the structure which enables the transparent film 1 to separate more easily. Hereinafter, repetition of detailed descriptions shall be avoided by attaching the same reference number to the same element, in the other drawings.

Figure 8:
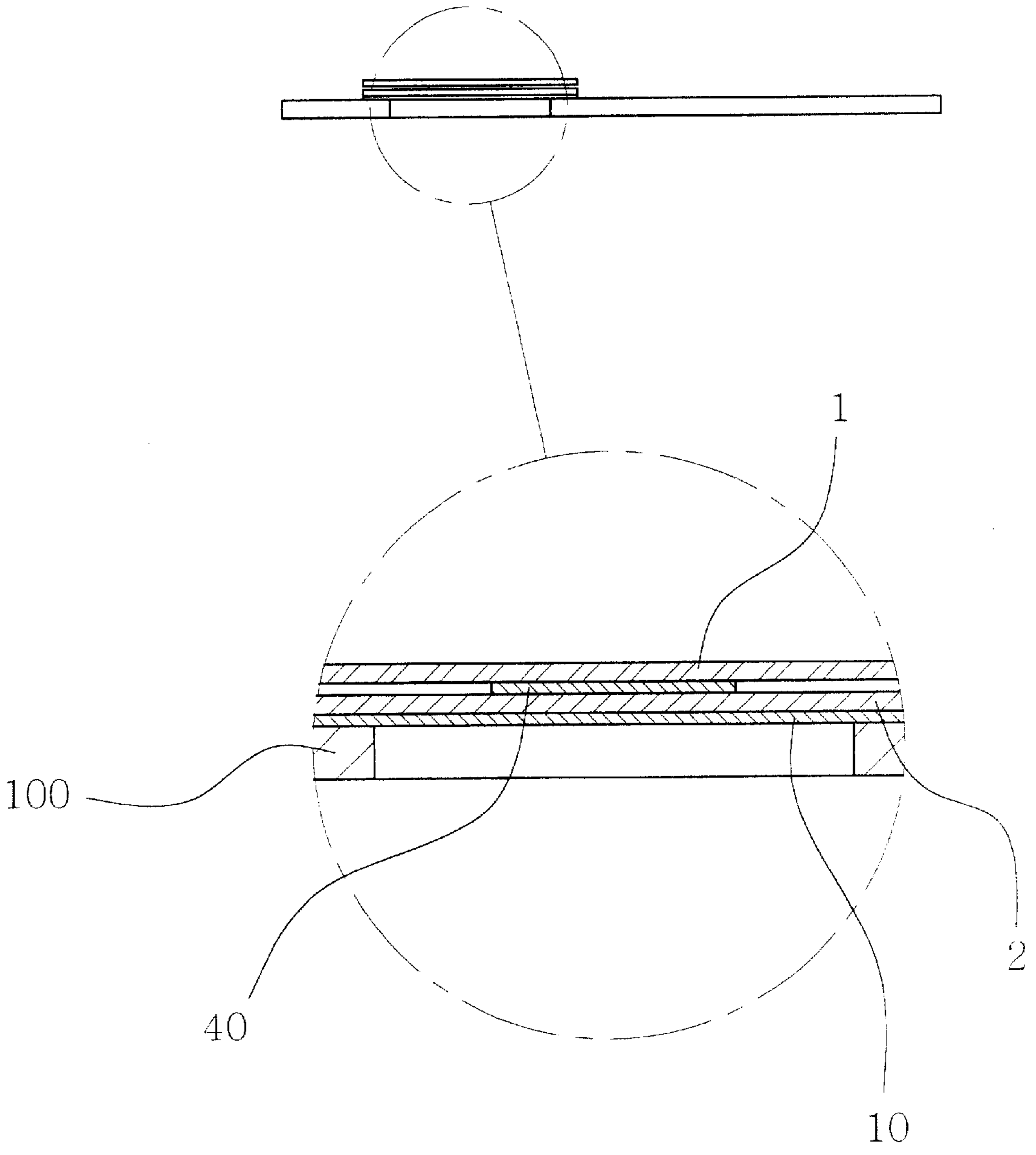
FIG. 8 shows a sectional view showing the structure for preventing the embezzlement of the prepayment using the self destructive type hologram according to the third embodiment of the present invention.
Figure 9:
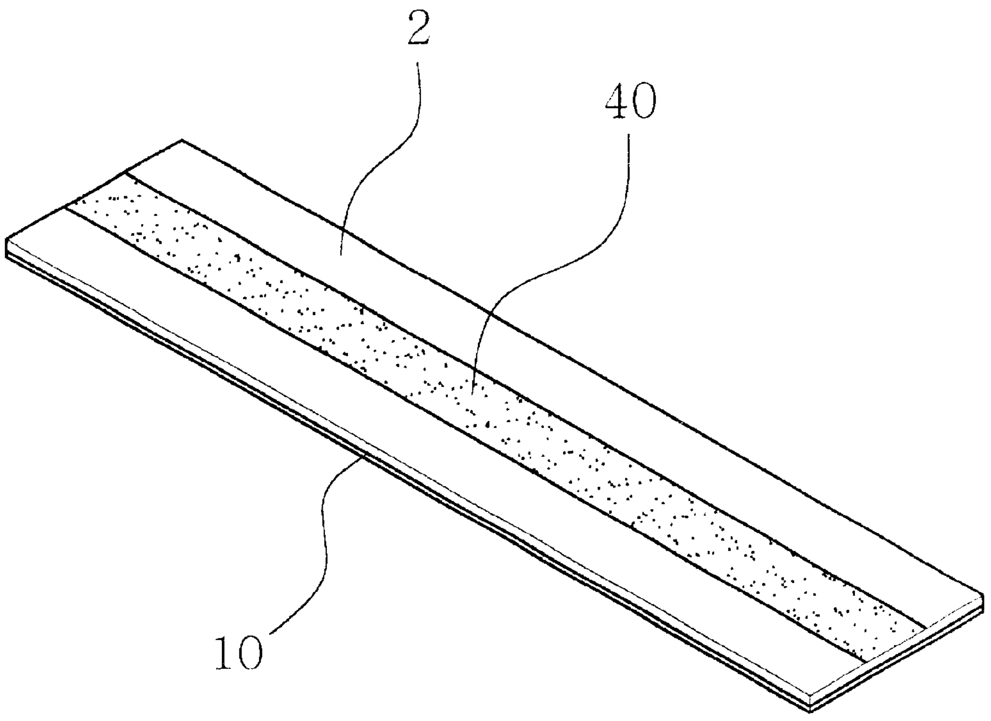
FIG. 9 shows a state view showing an application of the adhesives to the surface of the self destructive type hologram according to the third embodiment of the present invention.
Figure 10:
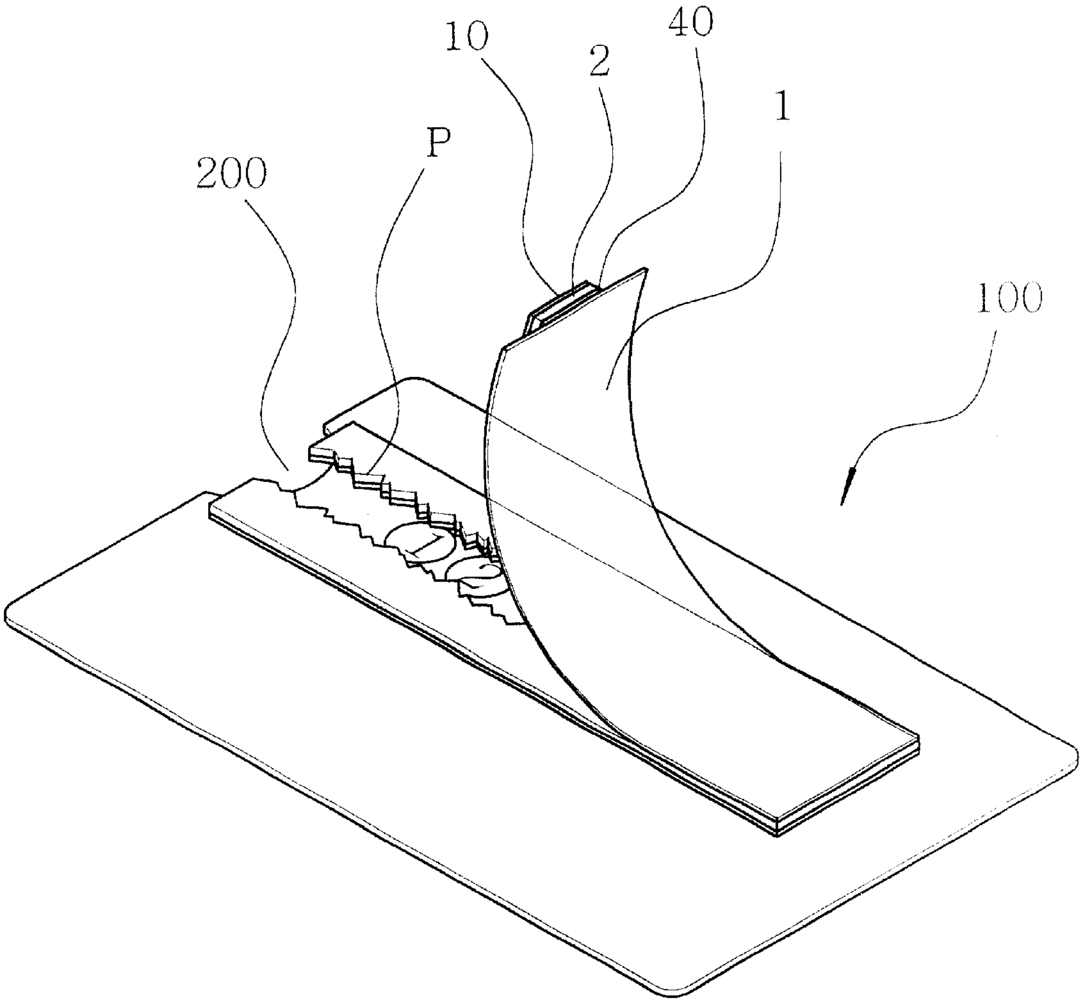
FIG. 10 shows a state view showing a removal of the transparent film from the self destructive type hologram attached to the back of the prepayment card according to the third embodiment of the present invention.

As Shown in FIG. 8 through FIG. 10 according to the third embodiment of the present invention. FIG. 8 shows a sectional view of the structure for preventing the embezzlement of the prepayment using the self destructive type hologram, FIG. 9 shows a state view showing an application of the adhesives to the surface of the self destructive type hologram, FIG. 10 shows a state view showing a removal of the transparency film from the self destructive type hologram attached to the rear face of the prepayment card.

As shown in FIG. 8 through FIG. 10 according to the third embodiment of the present invention, the self destructive type hologram 2 has the transparency film 1 attached on the surface so as to cover the number printing layer 70 after printing the card identification number on the rear face of the prepayment card 100. The first adhesive layer 10 is formed on the entire bottom of the self destructive type hologram 2 making it possible to attach the self destructive type hologram 2 to the rear of the prepayment card 100. A tape separation handle 20 is connected with a plurality of curved portions 11, and it is possible to remove the handle 20 by cutting the plurality of curved projections 11. The absence of handle 20 can notify a user that the prepayment card 100 was used. The handle 20 is formed on one side of the prepayment card 100. The third adhesive layer 40 has a predetermined adhesive strength which will remove the center portion of the hologram 2, and leave traces of such separation. Also, traces of a separation of the transparent film 1 from the self destructive type hologram 2 are apparent and prevent an embezzlement of the identification number of card 100 by preventing an undetected re-attachment of the transparent film 1.

Here, it is preferred that the adhesive strength of the third adhesive layer 40 is stronger than that of the first adhesive layer 10, to cause the center portion of the self destructive hologram 2 to lift up off card 100 more easily.

Hereinafter, the same reference numbers relating to the same parts as the first embodiment of the present invention will be shown.

Referring to the FIG. 8 through FIG. 10, the third embodiments according to the present invention are described in detail as follows.

First of all, the first adhesive layer 10 is formed on the entire bottom of the self destructive type hologram 2, and a tape separation handle 20 is connected to card 100 with a plurality of curved projections 11. It is possible to separate the handle 20 from the card 100 by cutting the plurality of curved projections 11.

Thereafter, the third adhesive layer 40 having predetermined adhesive strength in the lengthwise direction is formed at the center portion of the self destructive type hologram and then the transparent film 1 is attached to the self destructive hologram 2.

And, if the self destructive hologram 2 is attached to the number printing layer 70 of the card identification number on the rear face of the prepayment card 100 with the tape separation handle 20, the attachment of the self destructive hologram 2 is accomplished strongly by the first adhesive layer 10 applied to the entire bottom.

At this time, if the user purchases the prepayment card 100 as shown in the above description and would like to see the identification number on the rear face, first of all, the user swings the tape separation handle up and down.

When this is done the curved projection 11 is cut due to the swing of the tape separation handle 20. If the user pulls out the tape separation handle 20 after cutting the curved projection 11, both the tape separation handle 20 and the transparency film 1 which is attached to the surface of the self destructive hologram 2, are separated from the self destructive hologram 2.

At this time, the third adhesive layer 40 having a predetermined adhesive strength in the lengthwise direction is formed at the center portion between the self destructive hologram 2 and the transparent film 1 as shown in FIG. 9. The center portion of the self destructive hologram 2 is separated away from card 100, together with the transparency film 1, due to the adhesive strength of the third adhesive layer 40, when the transparency film 1 is pulled up away from card 100. Part of film 1 is separated from the self destructive type hologram 2 and another part of film 1 stays attached to hologram 2 due to strong adhesion of layer 40. The identification number printed on the number printing layer 70 of the rear face of the prepayment card 100 is disclosed when center portion of hologram 2 is pulled up with layer 10, film 1, and layer 40, as shown in FIG. 10.

in FIG. 10, the separation line (P) is irregular and jagged when the central portion of the self destructive hologram 2 is separated together with the transparent film as shown in FIG. 10. Everybody can recognize easily the re-attached state of the transparency film 1 from the change of the separation line(P) when the user tries to re-attach the transparent film to hologram 2, after the separation by a dishonest means.

Therefore, the present invention can prevent the theft of the identification number of the prepayment card 100 before the user uses the prepayment card 100, and can prevent the card from being on sale twice.

In addition, the separation of the transparency film 1 is done by the tape separation handle 20 which is connected with a plurality of curved projections 11 at one side of the prepayment card 100. The user can recognize whether the prepayment card 100 was used or not by curved projection 11 has been cut or not. Therefore, the present invention prevents theft of the prepayment card 100 prior to a purchase of the card.

Figure 11:
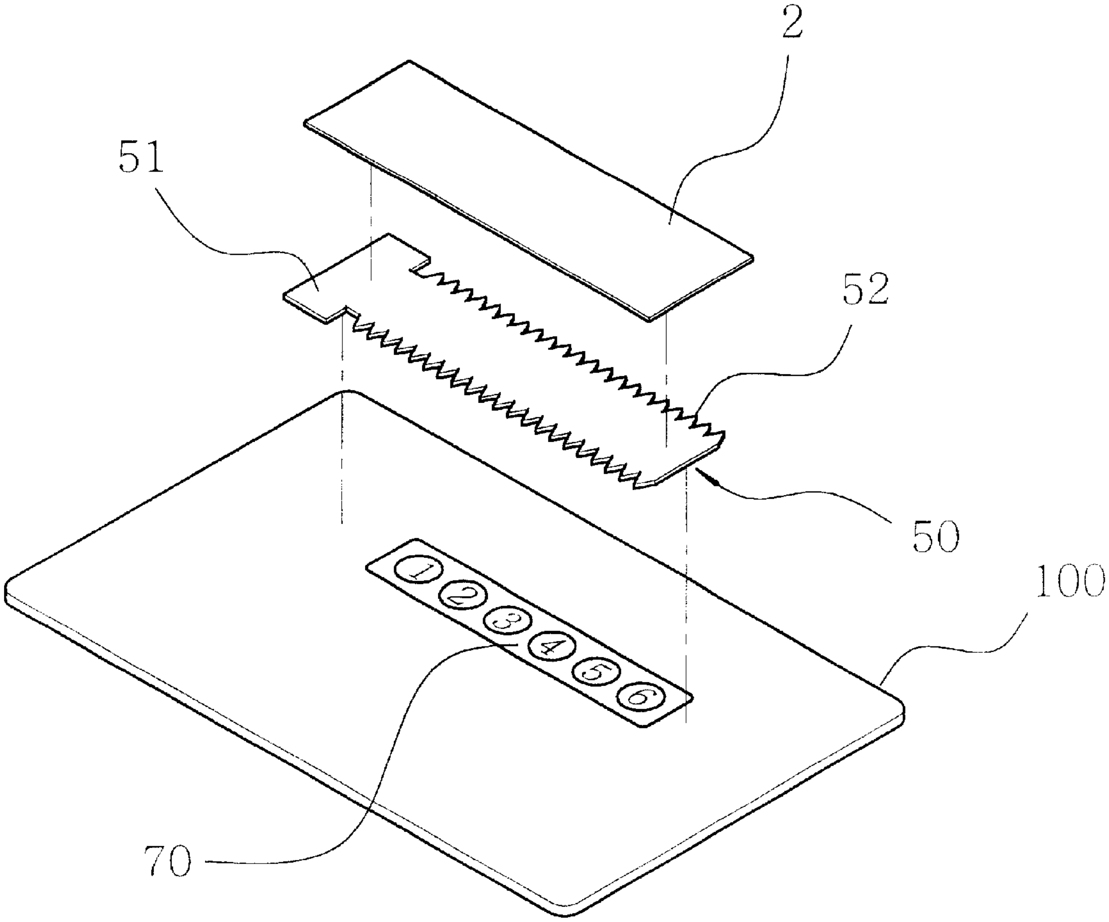
FIG. 11 shows an exploded view showing the state of attaching the film label and the hologram to the face of the printed identification number of the prepayment card according to the fourth embodiment of the present invention.
Figure 12:
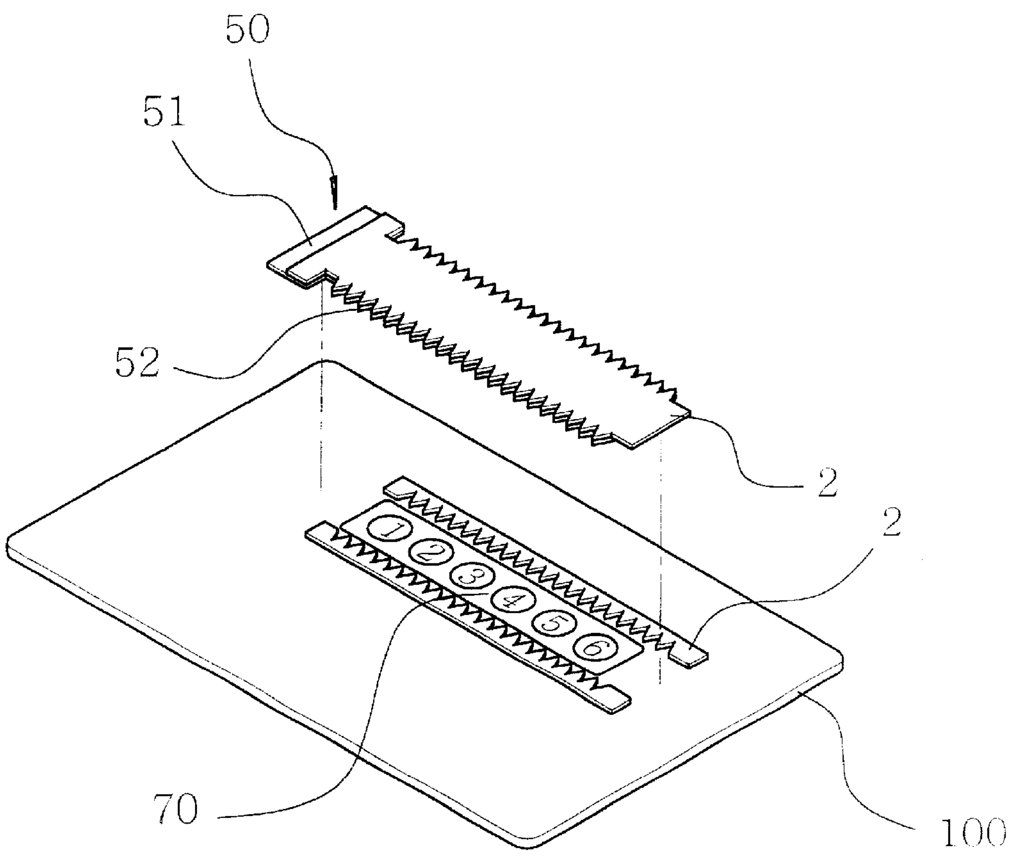
FIG. 12 shows a separation state view showing a separation of the film label and the hologram attached to the printing face of the identification number according to the fourth embodiment of the present invention.
Figure 13:
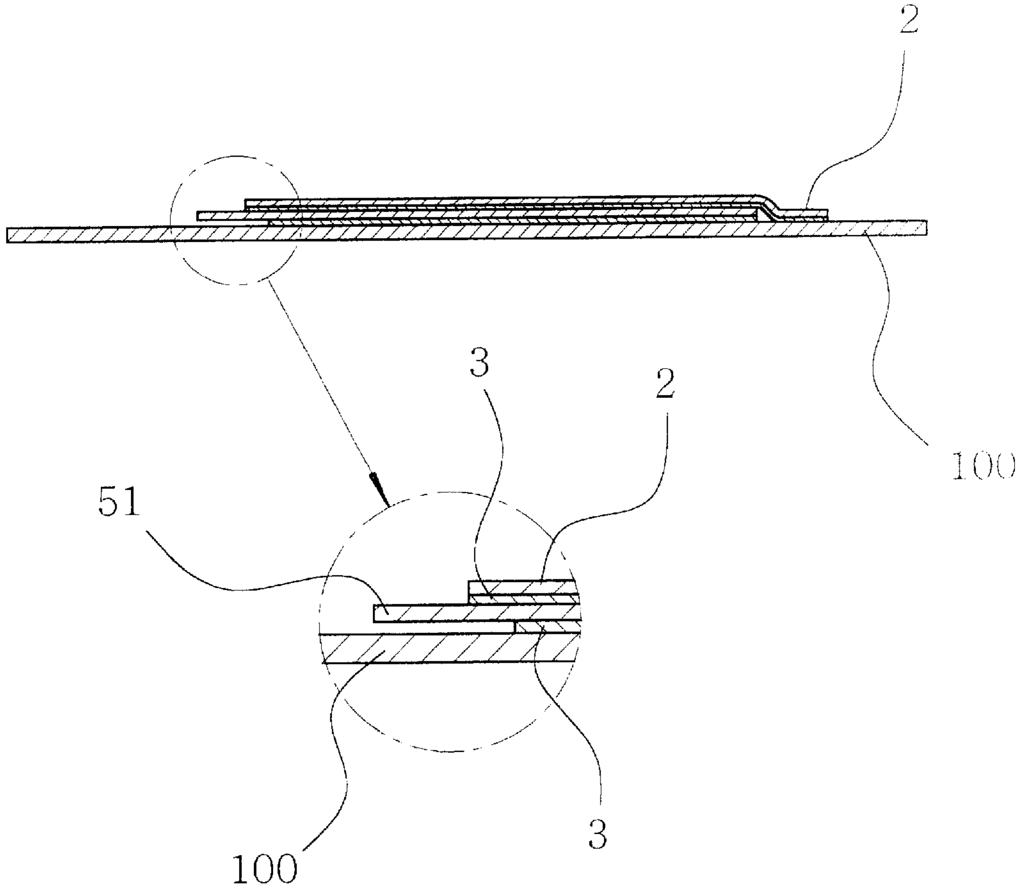
FIG. 13 shows a sectional view showing an attachment of the film label and the hologram to the printing face of the identification number according to the fourth embodiment of the present invention.
Figure 14:
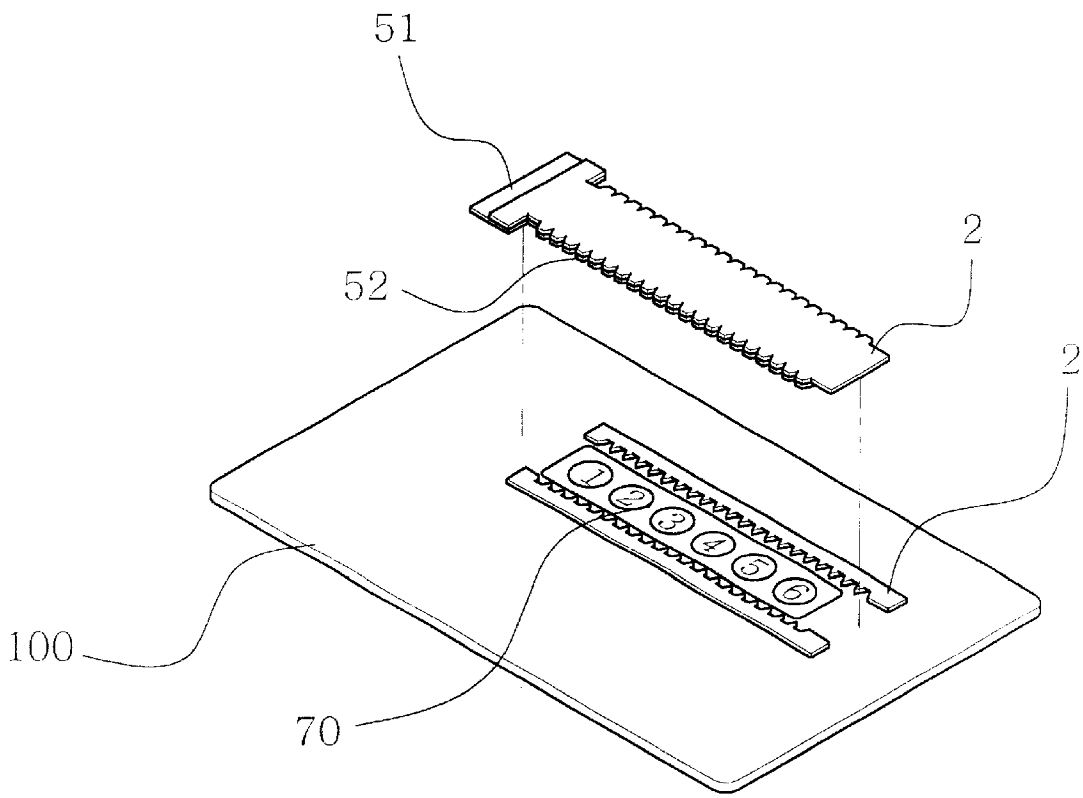
FIG. 14 shows a cutting state view showing a cutting of the film label and the hologram according to the fourth embodiment of the present invention.

As shown in FIG. 11 through FIG. 14 according to the fourth embodiment of the present invention, FIG. 11 shows an exploded view showing an attachment of the film label and the hologram to the face of the printed, identification number of the prepayment card, FIG. 12 shows a separation state view of the film label and the hologram attached to the printing face of the identification number of card, FIG. 13 shows a sectional view showing an attachment of the film label and the hologram to the printing face of the identification number of card, FIG. 14 shows a cutting state view of the film label and the hologram.

As shown in FIG. 11 through FIG. 14 according to the fourth embodiment of the present invention, the prepayment type card 100 has the number printing layer 70 of the card identification number on the center portion of the rear face. The irregularly-shaped tooth portion 52 (edge areas) of label 50 are attached to card 100, but label 50 is not attached directly to the numbers printed on the layer 70. The surface of label 50 is printed with a deep dark color, for example a black color, and the adhesive 3 is not applied to its one side part so as to protect visibility of the card identification number in the number printing layer 70. The self destructive type hologram 2 is altered when handle 51 pulls label 50 up, as shown in FIG. 12. The altered hologram 2 prevents card 100 from being re-sold. The tooth portion 52 corresponds to a jagged edge or an uneven edge.

Hereinafter, the same reference numbers will refer to the same parts as shown in the first and the third embodiments of the present invention.

Referring to the FIG. 11 through FIG. 14, the fourth embodiment according to the present invention is described in detail as follows.

First of all, the identification number is printed on the number printing layer 70 of the rear center portion of the prepayment type card 100.

The film label 50 has the dark color (for example, black color) is printed on its surface to prevent it from being transparent, and to prevent the card identification number from being viewed prematurely. Adhesive 3 holds label 50 onto card 100, but adhesive 3 does not cover layer 70. Therefore, label 50 can be pulled away from layer 70 without damaging the numbers on layer 70 and without removing the numbers from layer 70.

At this time, the label separation handle 51 is formed integrally to the one side part of the film label 50 and the adhesive 3 may not be applied on that side part, and the tooth portion 52 with the irregular pattern is formed on both sides of the film label 50.

Thereafter, the self destructive hologram 2 is attached by use of the adhesive 3 to the film label 50. Here, the film label 50 is covered entirely by said hologram 2 but the portion of the label separation handle 51 may not be covered.

Also, when the user would like to see the card identification number on the rear face after purchasing the user the prepayment card 100 as said above, the user pulls out the label separation handle 51 of the film label 50.

The hologram 2 which is attached to the upper part of the label separation handle 51 by the adhesive 3 is separated by pulling operation of the label separation handle 51. At this time, the self destruction phenomenon occurs along the tooth portion 52 of both side faces of the film label 50 by separating the tooth portion 52 at both sides of the film label 50.

By this phenomenon, the user can see the card identification number printed on the number printing layer 70 of the card 100, wherein the film label 50 and the center portion of the self destructive hologram 2 is separated but the peripheral portion of the self destructive hologram 2 remains attached to the rear face of the card 100 as shown in FIG. 12.

Here, if the user purchases and uses the prepayment card 100 normally as described above, there is no problem. But, if another person tries to re-attach the film label 50 to the rear side of the card 100 after separating the film label 50 once, because not only it is difficult to attach the film label 50 due to the shape of the tooth part 52 formed on the both sides of the film label 50, but also the traces remain even if he attempts to attach the film label 50 elaborately, so everyone can recognize the re-attached state easily. Therefore, a second sale, after the the identification number of the card has been revealed, can be prevented.

In addition, although one may try to cut along the outline, that is both sides, of the self destructive hologram 2 to have been covered the film label 50 with a knife (or other device) it is impossible to cut due to the tooth part 52 formed on the film label 50, but even if the tooth portion 52 was cut, the shape of cut as shown in FIG. 14 is formed.

Figure 15:
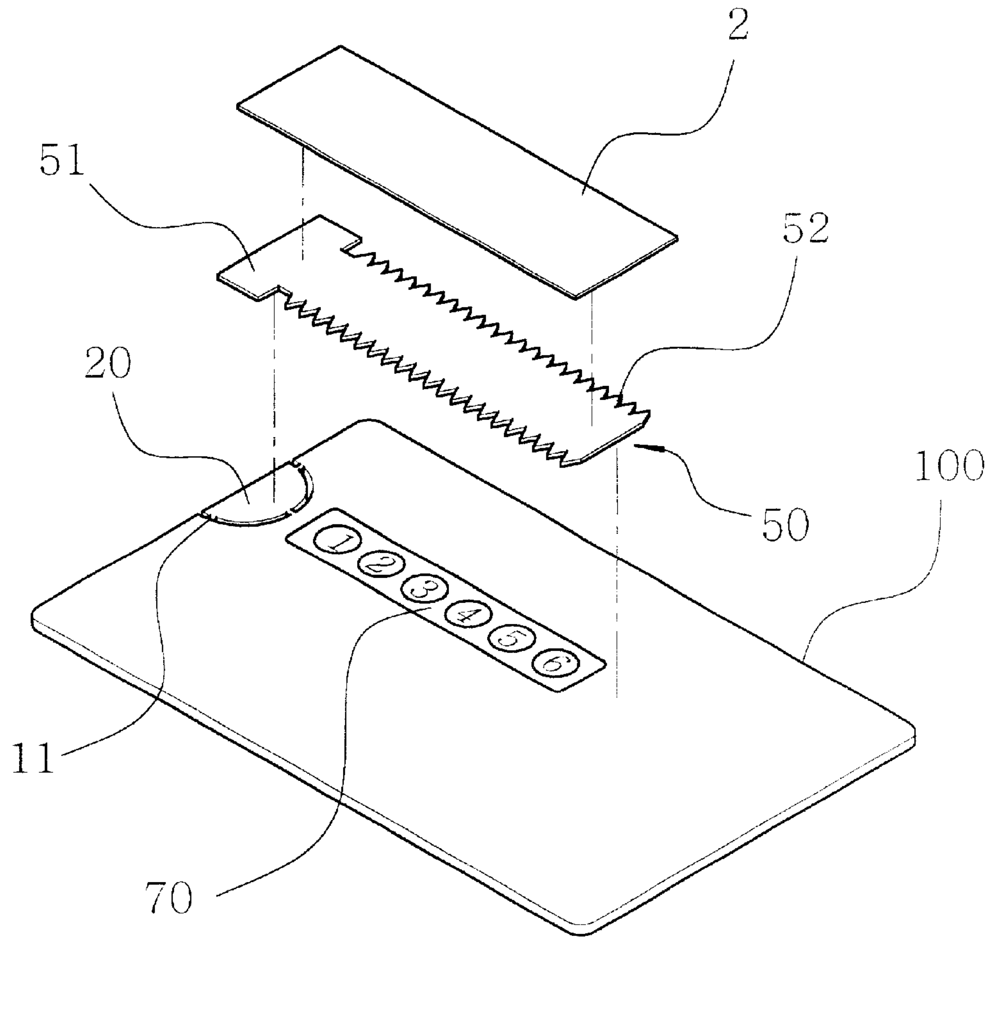
FIG. 15 shows an exploded view showing an attachment of the film label and the hologram to the printing face of the identification number of the prepayment card according to the fifth embodiment of the present invention.
Figure 16:
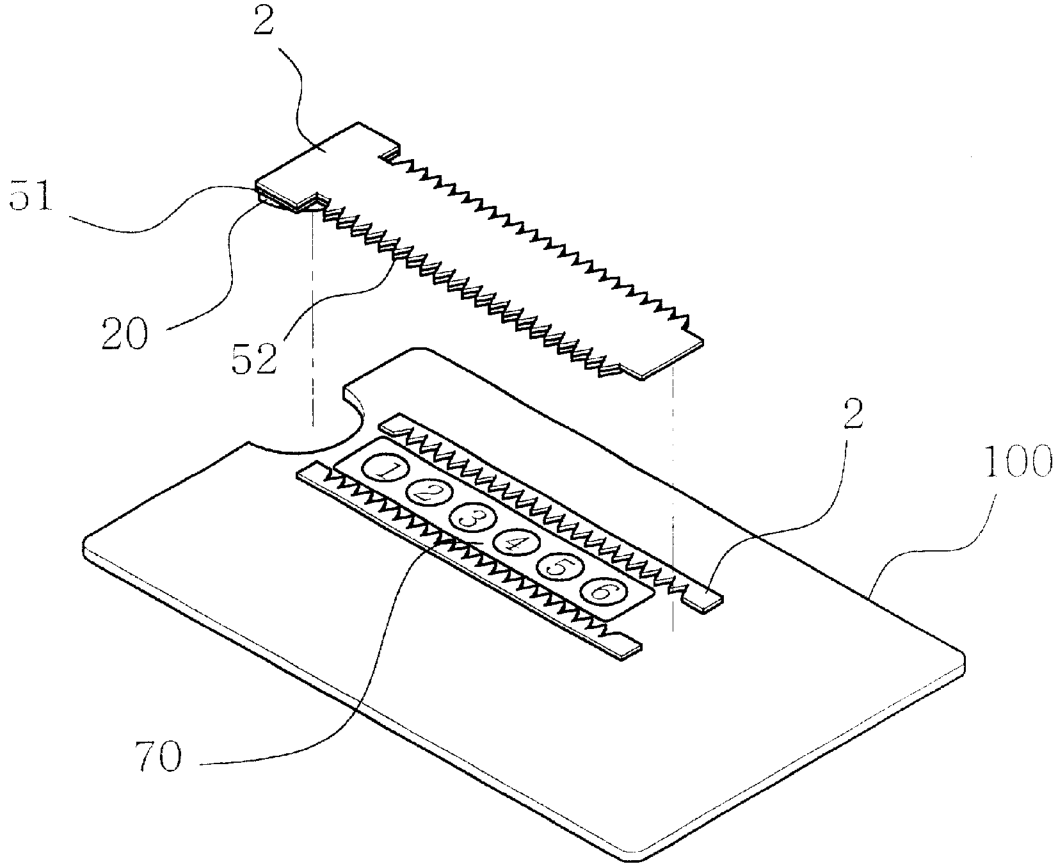
FIG. 16 shows a separation state view showing a separation of the film label and the hologram attached to the printing face of the identification number according to the fifth embodiment of the present invention.
Figure 17:
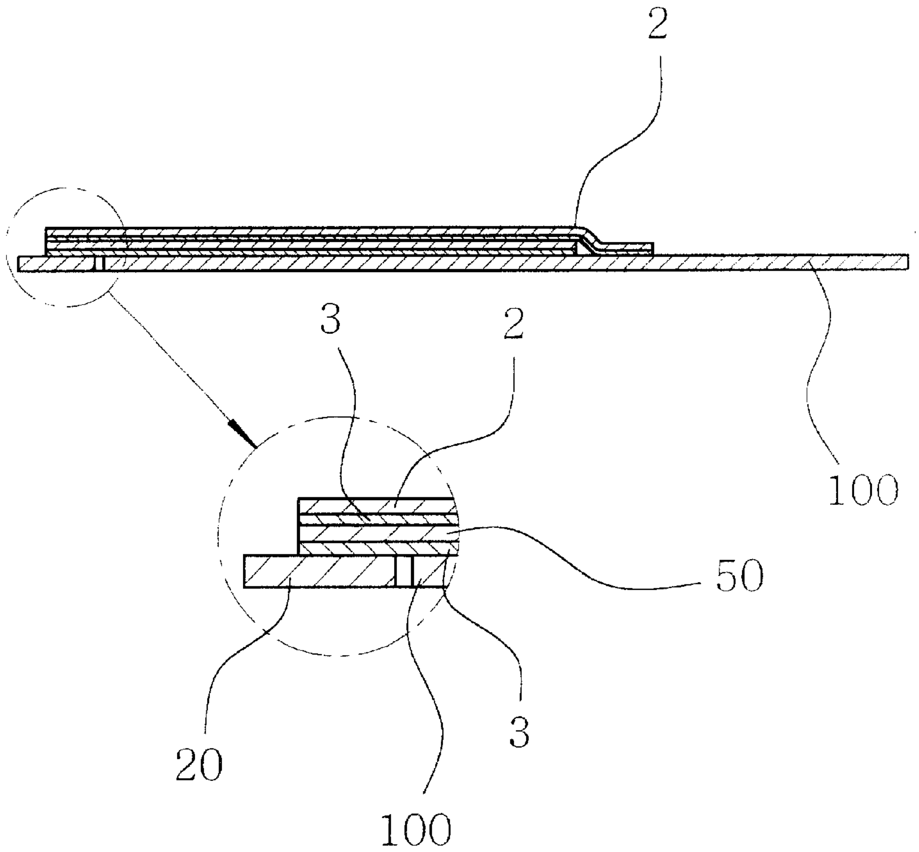
FIG. 17 shows a sectional view showing an attachment of the film label and the hologram to the printing face of the identification number according to the fifth embodiment of the present invention.

By this shape, if the film label 50 is re-attached, the shape does not match exactly the original shape. Thus, everyone can easily recognize the cutting state and will know that the card has been tampered with. Everyone will know that the card is being sold twice. Everyone will know that the special code has been viewed by someone, and everyone will know that the card is now probably worthless. Therefore, the prevention of an undetectable theft can be accomplished successfully. And the prevention of the double sale can be accomplished successfully As shown in FIG. 15 through FIG. 17 according to the fifth embodiment of the present invention, the fifth embodiment of the present invention includes the step of setting the number printing layer 70 of the card identification number which is biased a little to one side part of the rear face of the prepayment card 100. The fifth embodiment also includes forming the tape separation handle 20 which is connected with a plurality of cutting projections 11 to cut easily in a side of the prepayment card 100, and attaching the film label 50 having a label separation handle 51 and a tooth portion 52 in both of the tape separation handle 20 and the number printing layer 70 by adhesive 3. The fifth embodiment also includes attaching the self destructive type hologram 2 that prevents a second sale because traces of the film label remain due to the self destructive phenomenon occurring along both side faces of the tooth portion 52 when the film label 50 is separated, because of the adhesive 3.

That is, as shown in the fifth embodiment of the present invention, if the user catches the tape separation handle 20 located at the side of the prepayment card 100 and repeatedly it is tried to cutting toward up and down, a plurality of curved projection 11 is cut by the cutting of the handle 20.

At this time, the label separation handle 51 of the film label 50 is attached to the tape separation handle 20 by the adhesive 3. If the tape separation handle 20 is pulled up, the film label 50 which was covering the number printing layer 70 of the card identification number is pulled up away from layer 70.

At this time, the self destruction phenomenon occurs to the hologram 2 along both side faces of the tooth part 52 of the film label 50 to the hologram which is attached on the film label 50.

By this phenomenon, the user can see the card identification number printed on the number printing layer 70 of the card 100 because the center portion of the destructive hologram 2 is separated together with the film label 50, but the peripheral portion remains as being attached to the rear side of the card 100, as shown in FIG. 16.

Here, if the user purchases and uses the prepayment card 100 normally, there is no problem. But if another person tries to re-attach the film label 50 that has separated once from the. rear side of the card 100, not only is it difficult to attach the film label 50 by the shape of the tooth part 52 formed on both side faces of the film label 50, but also traces remain unless he attempts to attach the film label 50 elaborately, so everyone can recognize the re-attached state easily. Therefore, a second sale, after the card identification number has been once revealed can be prevented.

In addition, although one may try to cut the outline of the self destructive hologram 2 which is covered with the film label 50 along both side faces of the film label 50, with knife, etc., it is impossible to cut it due to the tooth portion 52 formed on the film label 50.

Even if the cutting portion is re-attached after a user has viewed the card identification number, due to the cut of the tooth portion 52, the suture of its cutting portion cannot be done with an ordinary method, therefore, it is possible to prevent a sale after the card identification number has been viewed.

Also, as shown in the fifth embodiment of the present invention, the tape separation handle 20 formed at one side portion of the card 100 is connected with the prepayment type card 100 by a plurality of curved portions 11, and the label separation handle 51 of the film label 50 is strongly attached by the adhesive 3 to the face of the tape separation handle 20.

It is possible to recognize whether or not the prepayment card 100 was used by the cutting of said curved portions 11.

Therefore, the fifth embodiment of the present invention has made it possible to effectively prevent a sale of the prepayment card 100 which is purchased and is previously used.

A repetition of information about the same reference numbers will be avoided since those numbers refer to the same part as shown in the first through the fourth embodiments of the present invention.

Figure 18:
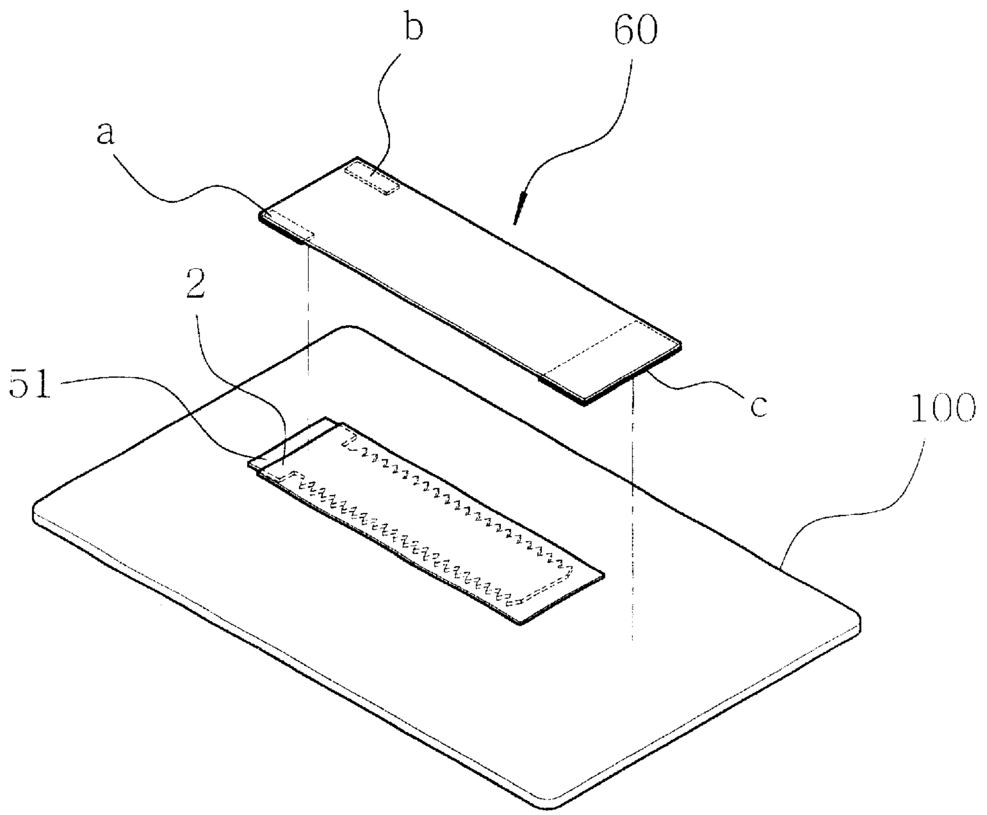
FIG. 18 shows a perspective view showing the structure for preventing stickiness of the adhesives in the prepayment card according to the sixth embodiment of the present invention.
Figure 19:
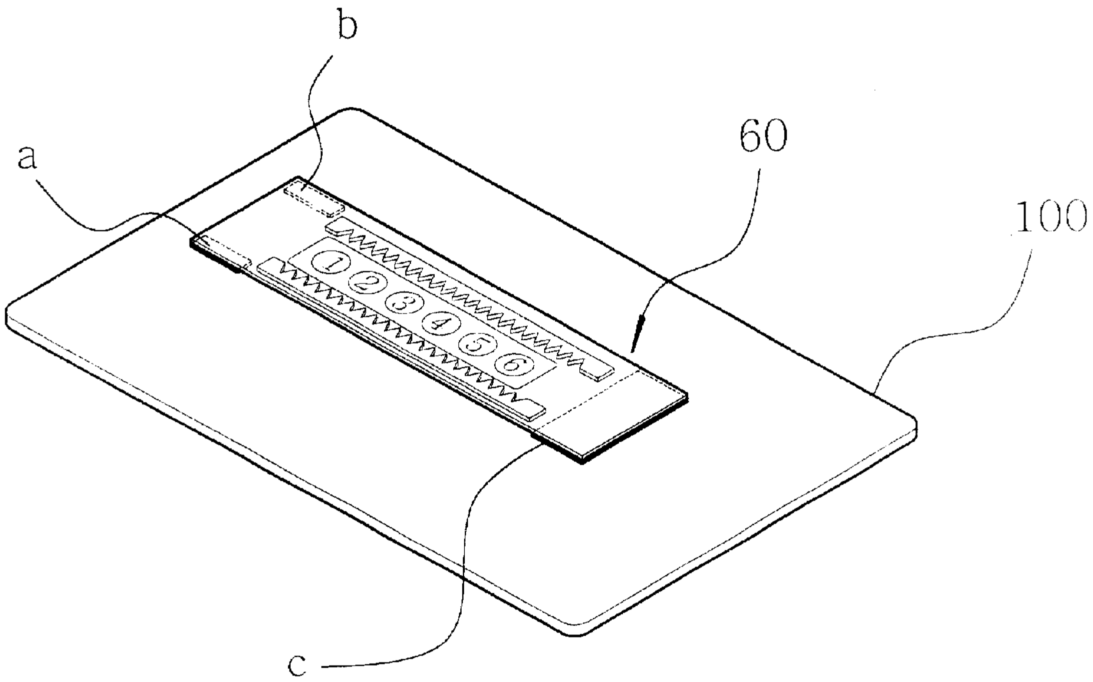
FIG. 19 shows a usable state view of FIG. 18.

Meanwhile, as shown in FIG. 18 through FIG. 19 according to the sixth embodiment of the present invention, this tries to solve problems relating to adhesives which remain around the self destructive hologram 2 when the film label 50 and the self destructive hologram 2 are pulled away from the rear side of the card 100. The prepayment card 100 may become stuck in the wallet or pocket due to the remaining adhesive 3 as shown in the fifth embodiment, but that problem can be solved by the label 60 of the sixth embodiment.

That is, although the stick-proof transparency label 60 having some tension covers the top of the film label 50, the adhesive 3 is applied on both the edge parts (a, b) of the one side part and on an edge (c) of the other side part of the transparent label 60, so a complete separation by the adhesive 3 of the other side part (c) does not occur while both the film label 50 and the self destructive hologram 2 are separated from the number printing layer 70 of the rear face of the card 100.

In addition, when the film label 50 and the self destructive hologram 2 are separated completely from card 100, the label 60 is still connected to card 100 due to the adhesive 3 of other side edge part (c). When the hologram 2 of the film label 50 is removed completely from card 100, the label 60 is strongly secured to card 100 by the adhesive 3 and label 60 covers the number printing layer 70 of the card, and adhesive 3 is applied on both the edge parts (a, b) of the one side by a tension operation.

At this time, it is possible to recognize the identification number printed on the number printing layer 70 of the rear face of the card 100 through the transparency film 60 because film 60 is transparent.

It is possible to prevent the stickiness of the adhesive 3 even though card 100 is put into the wallet or pocket, because the transparent label 60 covers all adhesive 3 remaining on card 100.

In the following description, some information will be omitted since it would be a duplicate description because the same reference number is used in the same part as shown in the first and the fifth embodiment of the present invention.

Figure 20:
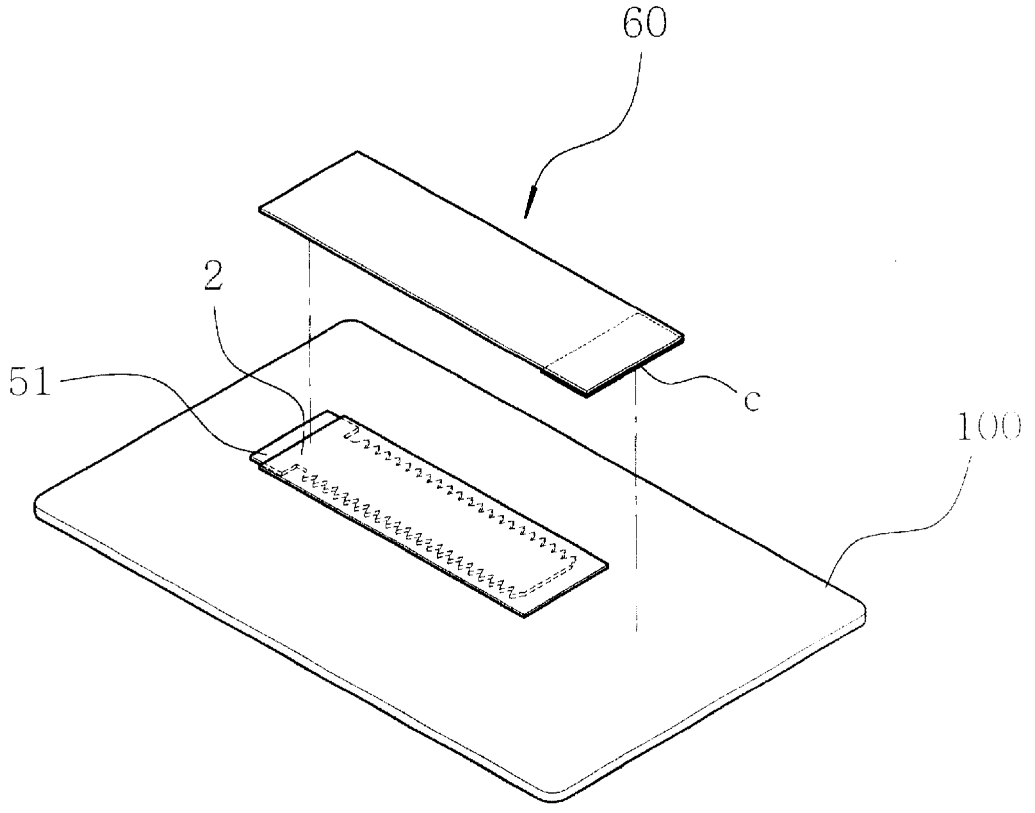
FIG. 20 shows a perspective view showing the structure for preventing stickiness of the adhesives in the prepayment card according to the seventh embodiment of the present invention.
Figure 21:
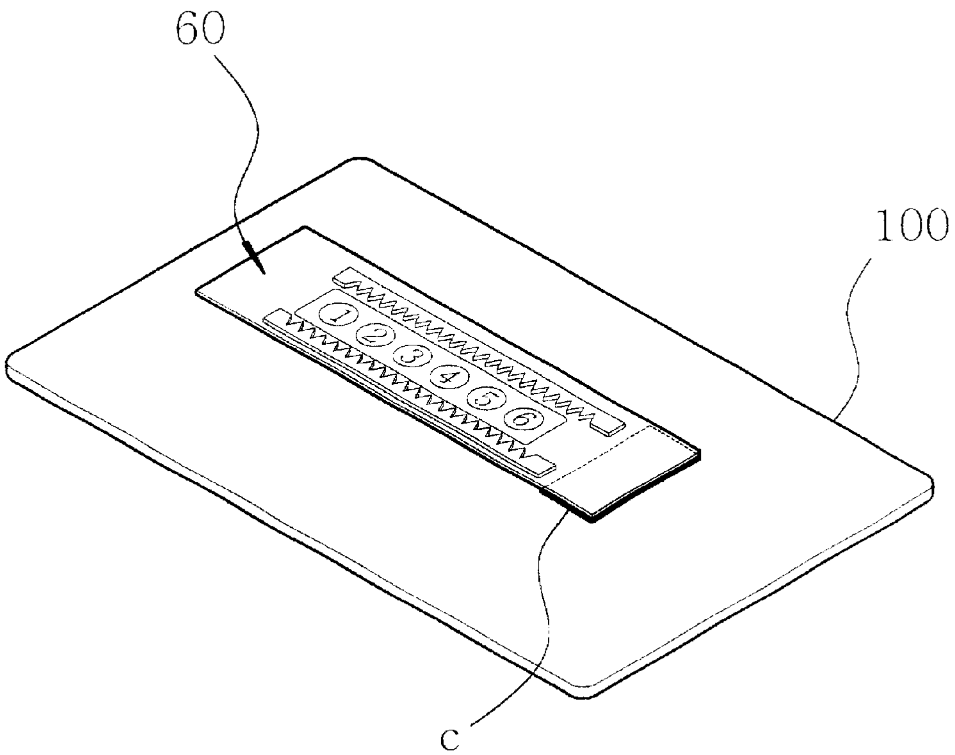
FIG. 21 shows a usable state view of FIG. 20.

FIG. 20 and FIG. 21 show the seventh embodiment of the present invention.

When the film label 50 and the self destructive type hologram 2 are separated from the rear face of the card 100 as shown in the fifth embodiment, some adhesive 3 remains. Accordingly, the seventh embodiment tries to solve the problems relating to the prepayment card 100 being stuck in the wallet or pocket by the remaining adhesive 3 after the card 100 is used.

That is, the transparency film 60 for preventing the stickiness is under tension when it covers the top of the film label 50 and the self destructive hologram 2. The adhesive 3 is applied only to the other side edge part (c) of the transparency label 60. Therefore, when the film label 50 and the hologram 2 are separated from the number printing layer 70 of the rear face of the card 100, the label 60 is connected and its complete separation must not be done by the adhesives of the other side edge part (c). When the hologram 2 of the film label 50 is separated completely from card 100, the fixing of label 60 is strongly done by the adhesive 3 which cover the number printing layer 70 and which is applied to the other side edge part (c), by its tension operation.

At this time, it is possible to recognize the identification number printed on the number printing layer 70 of the rear side of the card 100 through the transparency film 60. Although the card 100 is stuffed into the wallet or pocket, it is possible to prevent the stickiness of the adhesive 3 because the transparency label 60 remains to cover over all of the adhesive 3.

In the following description, some information will be omitted since it would be a duplicate description because the same reference number is,used in the same part as shown in the first and the sixth embodiment of the present invention.

The eighth embodiment is not shown in the drawings. The eighth embodiment is described as follows. Although not shown, the eighth embodiment of the present invention has the identification number printed on the number printing layer 70 as the rear face of the card 100, and then label of a transparent material having a tooth shape is attached on it, and silicon as heteromorphism is applied on the surface of the label. And, if the self destructive hologram is covered on and around the label where the silicon is applied, only the self destructive hologram 2 is separated when the self destructive hologram 2 is separated from the card 100. Also, the separation of the label which has the silicon on its surface must not come off. At this time, the label is made of a transparent material so that it is possible to recognize the identification number of the card 100 easily and the shape of separation is determined by the tooth shape of the label when the hologram 2 is separated, thereby it produces the same effect as in the first through the fifth embodiments.

Figure 22:
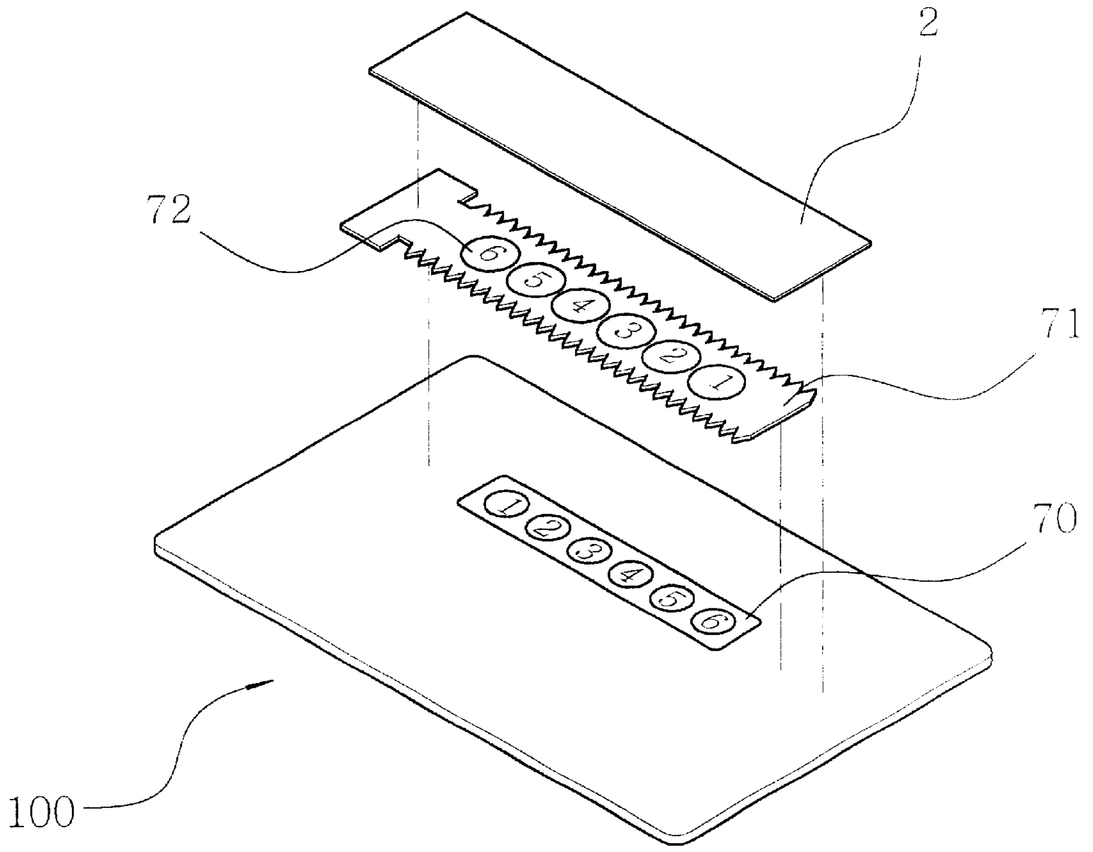
FIG. 22 shows an exploded schematic diagram showing the structure for preventing one from seeing through the prepayment card, and preventing a premature viewing of the number, by use of the dummy number according to the ninth embodiment of the present invention.
Figure 23:
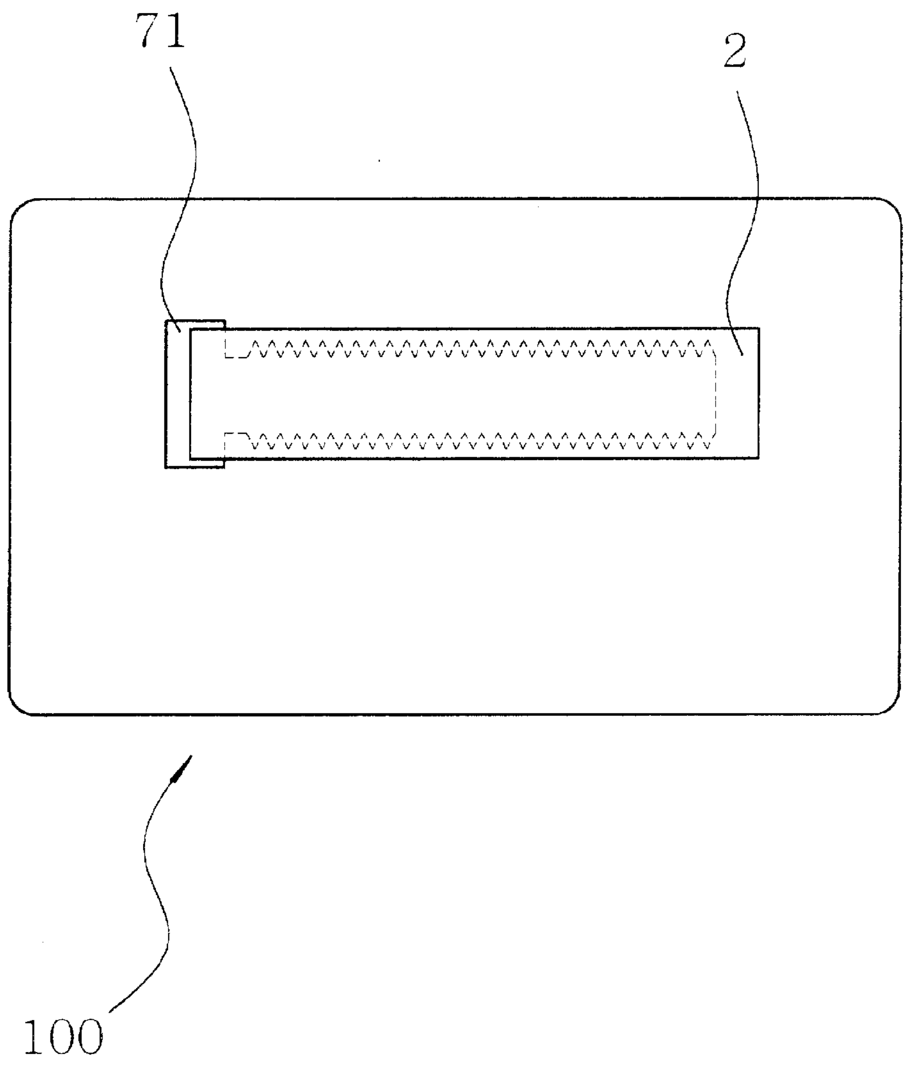
FIG. 23 shows a plane figure showing the structure for preventing the premature viewing of the prepayment card using the dummy number according to the ninth embodiment of the present invention.
Figure 24:
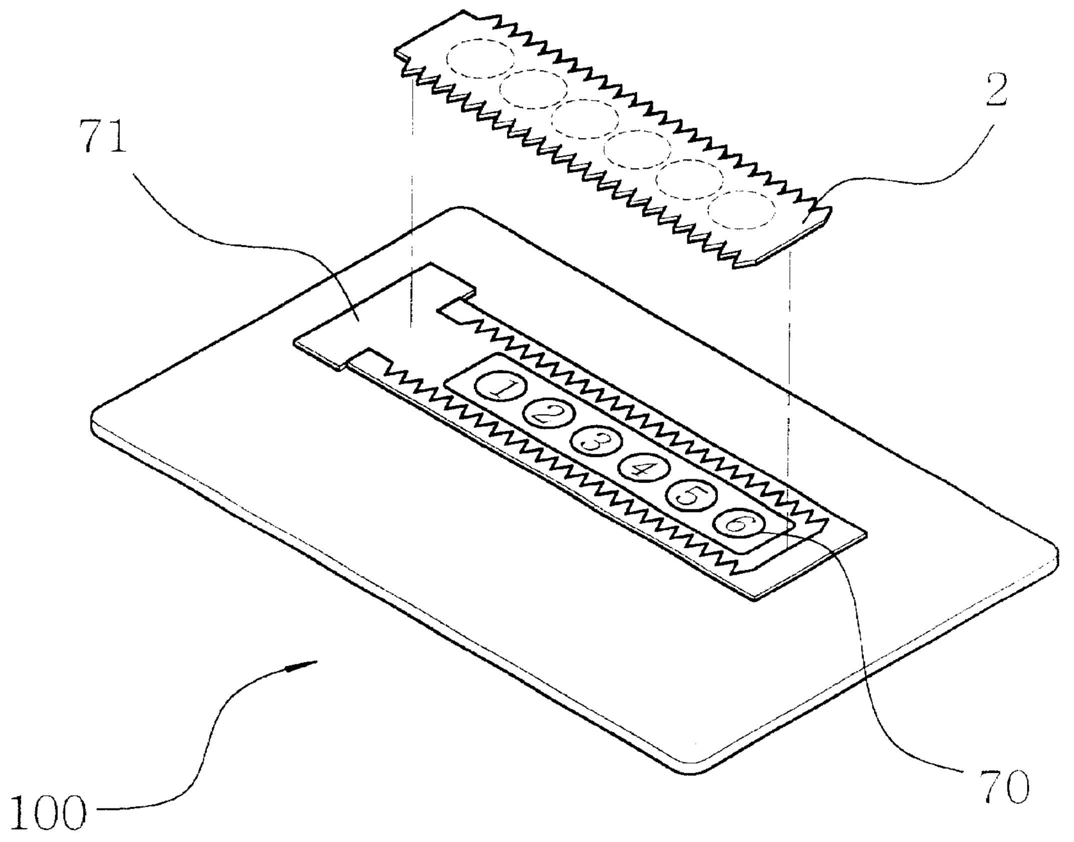
FIG. 24 shows a usable state view showing the structure for preventing the premature viewing of the prepayment card using the dummy number according to the ninth embodiment of the present invention.

As shown in FIG. 22 through FIG. 24 according to the ninth embodiment of the present invention, FIG. 22 is an exploded schematic diagram showing the structure for preventing the premature viewing of the prepayment card, FIG. 23 is an assembled schematic diagram showing the structure preventing the premature viewing of the prepayment card, FIG. 24 is a side sectional schematic view showing the structure for preventing the premature viewing of the prepayment card.

As shown in FIG. 22 through FIG. 24, the ninth embodiment includes forming as applied the silicon layer 71 which has the adhesive property and is possible to see through with the predetermined pattern on the plane, forming the dummy number 72 which is printed over the real identification number preventing the real identification number layer 70 of the card from being viewed, attaching the hologram 2 blocking a view of the real identification number of the card through the silicon 71, peeling the silicon 71 and dummy layer 72 simultaneously along the predetermined pattern.

Here, as the silicon layer 71 dries under the predetermined temperature after it is applied on the number printing layer 70, the adhesive property is formed on the plane of the silicon layer 71, and the hologram 2 used is the self destructive type hologram.

In the ninth embodiment of the present invention, the silicon layer 71 has an adhesive property on the plane and a quality that makes it possible to see-through it. The silicon layer 71 is formed as applied with the predetermined pattern on the number printing layer 70 since the number printing layer 70 has formed on it the real identification number of the card on the rear face of the prepayment card 100.

Here, it is desirable to apply the predetermined pattern of the silicon layer 71 in the saw pattern.

The predetermined adhesive property is formed on the silicon layer 71 and dries thereafter. The dummy number layer 72 on which the dummy number is printed to prevent the premature viewing of the real identification number of the card which is printed on the number printing layer 70.

The self destructive type hologram 2 is attached on the dummy number layer 72. The hologram 2 and dummy number layer 72 prevent a premature viewing of the real identification number of the card. When the edge face is peeled along the saw pattern of the silicon 71, then hologram 2 is destroyed or altered and layer 72 is removed, in order to reveal layer 70.

So, with the self destructive type hologram 2 and dummy number layer 72, even if third parties try to see through the layers to prematurely view the real identification number of the card by special equipment, the real card identification number and the dummy number are shown to be overlapping each other, therefore, it is impossible to see through the layers to prematurely view. the real identification number of said prepayment card 100.

That is, the ninth embodiment of the present invention does not allow anyone to see through the layers to view the real identification number of the card until the self destructive type hologram 2 is peeled away from the prepayment card 100.

Also, when the user separates the self destructive type hologram 2 from the prepayment card 100, the peeling of the self destructive type hologram 2 causes the same saw pattern of the silicon layer 71.

Accordingly, even if the self destructive type hologram 2 is re-attached to re-sell the prepayment card 100 after the real identification number of the card has been viewed, it is possible for anyone and everyone to easily recognize the re-attachment condition of the self destructive type hologram 2 due to the saw pattern associated with the peeling.

Therefore, the present invention can prevent the embezzlement or theft of the real identification number of the prepayment card 100, and can prevent a sale of the card after someone has viewed the card identification number.

In the following description, some information will be omitted since it would be a duplicate description because the same reference number is used in the same part as shown in the first through eighth embodiments of the present invention.

Figure 25:
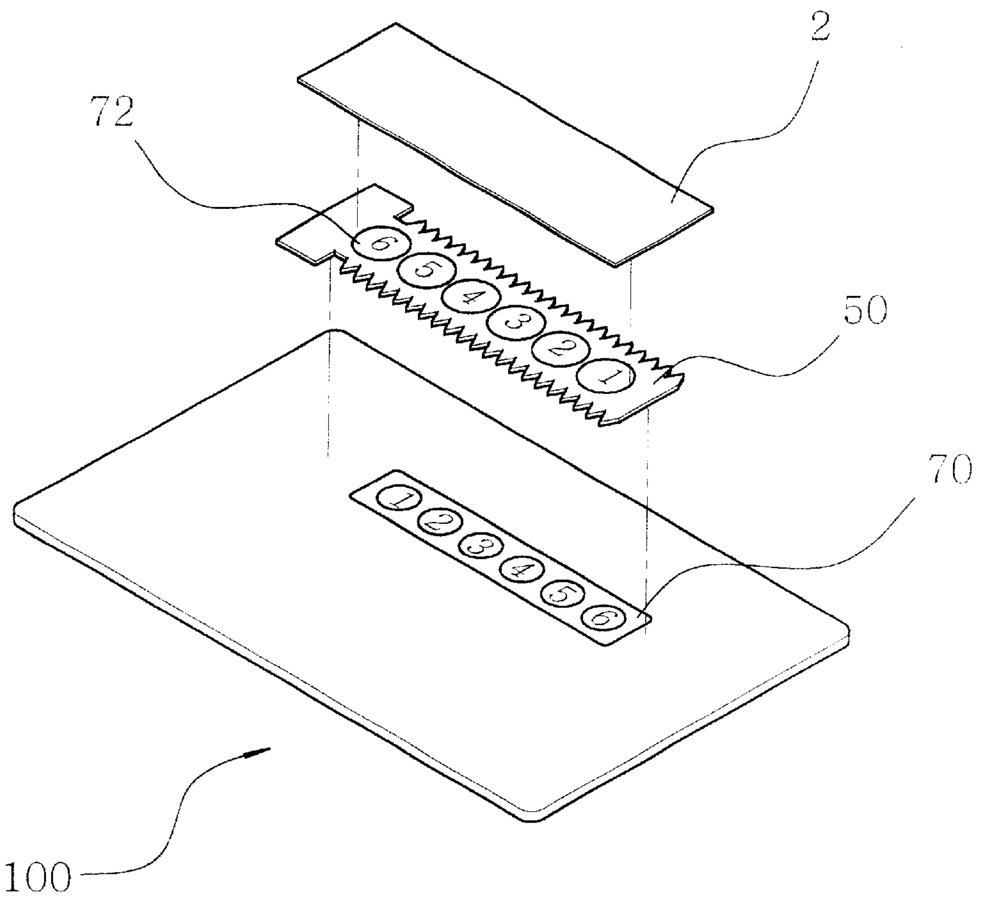
FIG. 25 shows an exploded schematic diagram showing the structure for preventing the premature viewing of the prepayment card using the dummy number according to the tenth embodiment of the present invention.
Figure 26:
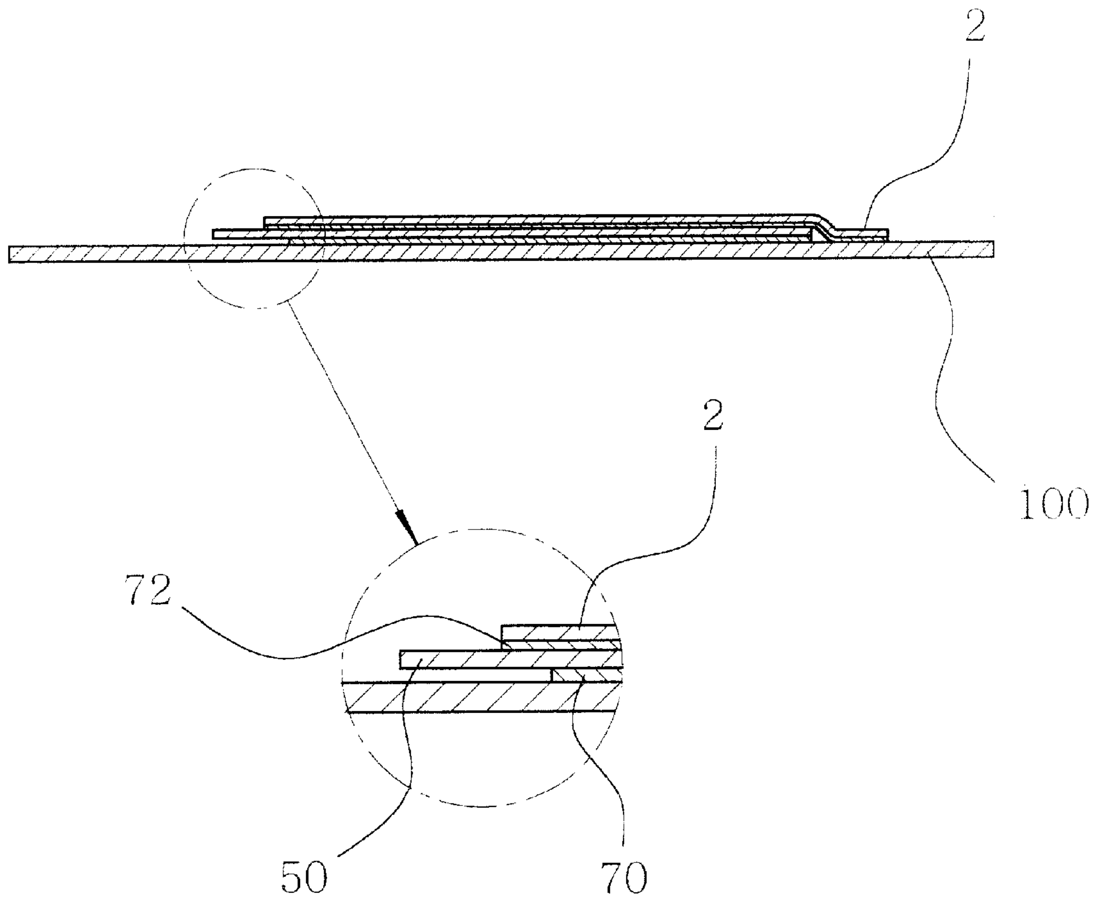
FIG. 26 shows a side sectional view of FIG. 25 according to the tenth embodiment of the present invention.

Meanwhile, as shown in FIG. 25 and FIG. 26 according to the tenth embodiment, FIG. 25 is an exploded schematic diagram showing the structure for preventing the premature viewing of the prepayment card, FIG. 26 shows to a schematic diagram of side edge face of FIG. 25.

That is, as shown in FIG. 25 and FIG. 26, it is possible to produce the effect which is the same as the effect of the first embodiment of the present invention by attaching the film label 50 having the saw pattern to the top of the number printing layer 70 having the real identification number of the prepayment card 100, forming the dummy number layer 72 on which is printed the dummy number overlaps with the real identification number of the card on top of the film label 50, attaching the self destructive type hologram 2 on top of said dummy number layer 72, with the hologram 2 being attached in a way that will cause traces of hologram 2 to remain on card 100 after label 50 is pulled off of the card 100.

In the following description, some information will be omitted since it would be a duplicate description because the same reference number is used in the same part as shown in the ninth embodiment of the present invention.

The thickness of the number printing layer 70, the adhesive 3, the first adhesive layer through the third adhesive layer 10, 30, 40, the silicon layer 71, the dummy number layer 72, the transparency film 1, the self destructive type hologram 2, the film label 50 and the transparency label 60 are shown in the figures for convenience of the description.

Also, said dummy number layer 72 could be applied to the first through the eighth embodiments.

As described in the above, the present invention provides the following effect. That is, a transparency film having a predetermined pattern attached to its one side so that it can stick to the rear face of the prepayment card on which the identification number is printed, so that it is possible that a trace of a hologram the surface of the card when the transparent film is removed by a dishonest means, thereby preventing the used prepayment card(or lottery ticket) from being sold after being viewed, and preventing disorder of commercial transactions.

Also, the present invention provides the following effect. That is, printing the dummy number to overlap with the real card identification number on top of dried silicon, and attaching the hologram (or the self destructive type hologram) to the top of the dummy number, thereby preventing disorder of commercial transaction and preventing a sale of the card after the layer 70 has been viewed.

The present invention provides a self destructive type hologram which has a transparent film attached on its surface so as to cover a number printing layer on which the identification number of card of a prepayment card is printed wherein, a structure for preventing the embezzlement of the prepayment card using the self destructive type hologram, comprising the steps of: forming the first adhesives layer to the bottom of the self destructive type hologram entirely with the self destructive type hologram being attached to the rear of the prepayment card and being possibly discovered by scratching; forming a tape separation handle on one side of the prepayment card which is connected by a plurality of curved projections which can be separated by cutting of the plurality of curved projections, thereby notifying everyone of a previous use of the prepayment card; and applying the second adhesives layer, which is shaped into a predetermined pattern, between the transparent film and the self destructive hologram so that traces of separation remain after the time that the transparent film is separated from the self destructive hologram, thereby preventing undetected embezzlement of the identification number of card by preventing undetected re-attachment of the transparent film.

The present invention provides a structure for preventing the embezzlement of the prepayment card, wherein the second adhesives layer is adjusted to appear as a check pattern, character pattern, or letter, etc., when the transparent film is separated from the self destructive type hologram.

The present invention provides a structure for preventing the embezzlement of the prepayment card, wherein a cutting potion is formed at the one side of the prepayment card so that the transparent film can be easily separated while the self destructive type hologram covers only the number printing layer of identification number.

The present invention provides a self destructive type hologram with a transparent film attached on its surface so as to cover a number printing layer on which the identification number of card of a prepayment card is printed, and a structure for preventing the embezzlement of the prepayment card, comprising the steps of: applying the first adhesives to the bottom of the self destructive type hologram entirely which ensures that the self destructive type hologram is attached to the rear of the prepayment card; forming a tape separation handle at one side of the prepayment card which is connected through a plurality of curved projections and and which can be separated by cutting of the plurality of the curved projections, with the separated handle notifying everyone that the prepayment card was used; and forming the third adhesives layer having predetermined adhesive strength enough to remove the central part of hologram while leaving traces of separation at the time showing that the transparent film was separated from the self destructive type hologram, thereby preventing an undetected embezzlement of the identification number of card due to the easy detection of the re-attachment of the transparent film.

The present invention provides a prepayment card having the number printing layer of the identification number of card at its rear center, with a structure for preventing the undetected embezzlement of the prepayment card, comprising the steps of: attaching the film label to the number printing layer with adhesives, wherein the film label is printed by deep colored ink opaque enough to prevent premature viewing of the identification number and has a label separation handle where the adhesives is not applied and tooth portions with irregular shape on both its sides; attaching the self destructive type hologram on the film label, wherein traces of the self destructive type hologram remain due to a self destructive phenomenon occurring, along with the tooth portions of both its sides, thereby prevents the double sale of card; and fixing a stick-proof transparent film having an amount of tension, wherein a stick-proof transparent film covers the number printing layer by its tension when the film label and the self destructive type hologram are separated from the number printing layer of the prepayment card so as to prevent any exposed area, such as the printed area, from being sticky due to exposed adhesives.

The present invention provides a structure for preventing the embezzlement of the prepayment card using the self destructive type hologram in the prepayment card having the number printing layer of the identification number of card to the part of rear side, comprising the steps of: forming a handle on a side of the prepayment card which is connected with a plurality of cutting projections that can be cut; and attaching the film label having a label separation handle and a tooth portion on both the tape separation handle and the number printing layer by adhesives; wherein traces of a removed film label remain on the film label along the tooth portion of both sides when the film label is separated.

The present invention provides a prepayment card having the number printing layer on which is printed the real identification number of the rear face of the card wherein, the structure for preventing the see-through of the prepayment card, comprising the steps of: forming as applied the silicon layer which has the adhesives property on the plane and is opaque with the predetermined pattern on top of said number printing layer; forming the dummy number layer to have the dummy number which is different from the real identification number of the card to prevent the viewing of the real identification number of the card which is overlapped with the real identification number of the card printed on the number printing layer on top of the silicon layer; attaching the self destructive type hologram preventing a viewing of the real identification number of the card through the silicon; attaching the dummy number layer so that when it is peeled, it is peeled along the predetermined pattern of the silicon layer on top of said dummy number layer; attaching the film label having the saw pattern on top of said number printing layer; forming the dummy number layer having the dummy number overlapping with the real identification number of the card on top of said film label; and attaching the self destructive type hologram will remain after there is an attempt to remove it. The real identification number can be referred to as a genuine identification number or a true identification number. The dummy identification number can be referred to as a non-genuine identification number or a false identification number.

The present invention provides a technique for protecting the embezzlement of the lottery ticket or the identification number of the prepayment card (for example; the wired and wireless telephone card) charged as a pre-paid card. The present invention provides a structure for preventing the embezzlement and seeing through and premature viewing of the prepayment card as attached to a transparent film having a predetermined pattern to one side of the prepayment card so that it can stick to the rear face of the prepayment card on which the identification number is printed. It is not possible to recover the original state as a trace remains on the surface of the hologram, due to the transparent film having a predetermined pattern, when the transparent film is removed by a dishonest means. The silicon is applied to the printed face on which the identification number is printed and is dried thereafter, the dummy number is printed to overlap with the original identified number on its upper part therefor, when it is on sale with the reattached film label everyone can recognize easily that the card has been already used. Also, the present invention can prevent anyone from seeing through the card to view the identification number of the prepayment card, thereby preventing the card from being for sale after the identification number has been viewed, therefore, it is possible to prevent disorder and instability in commercial transactions.

The foregoing paragraphs describe the details of the technique for preventing the embezzlement of the lottery ticket or the identification number of the prepayment card (for example; the wired and wireless telephone card) charged as a pre-paid card. More particularly, the present invention relates to the structure for preventing the embezzlement of the prepayment card, wherein the self destructive type hologram covers the printed identification number in the rear face and a trace remains which prevents the prepayment card from being recovered to original state when it is destroyed by a dishonest means to see the covered identification number, so when it is on sale with the reattached film label everyone can recognize that it is already used, thereby preventing a double sale after the identification number has been revealed. And, the present invention relates to the structure for preventing the ,seeing through of the prepayment card which can be prevented in advance by blocking third parties from viewing the identification number of the prepayment card. That is, the silicon is applied on the number printing layer on which is printed the card identification number on the rear face of the prepayment card and is dried thereafter, the dummy number is double printed on the upper part of the dried silicon to be overlapped with the original identification number of the card and the hologram is attached to the top of the dummy number. Therefore, the present invention can prevent third parties from seeing the prepayment card identification number. The silicon layer 71 can also be referred to as a predetermined unit 71, for example. The silicon layer 71 can be replaced by other components, other than silicon, which can still accomplish the same objectives, in accordance with the principles of the present invention. The self-destructive hologram 2 can also be referred to as a portion bearing a holographic image, or as a unit bearing a holographic image.

The silicon layer 71 can have an opaque lower layer, so that the dummy identification number is visible at an upper layer of the silicon 71 and the real identification number is not visible due to the opaque lower layer. When the silicon 71 is removed from the card 100, then the real identification number is visible.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:

forming a first adhesive layer between a front surface of a card and a rear surface of a portion bearing a holographic image, the card bearing an identification number, the portion bearing the holographic image being adhered to the card to cover the identification number;

forming a removable tape separation handle at an edge of the card, the tape separation handle being connected to the card by a plurality of curved projections, the tape separation handle being removed from the card when the curved projections are cut; and forming a second adhesive layer between a transparent film and a front surface of the portion bearing the holographic image, the second adhesive layer being formed to display at least one mark when the transparent film is separated from the portion bearing the holographic image.

2. The method of claim 1, the first adhesive layer being formed on the rear surface of the portion bearing the holographic image.

3. The method of claim 1, the at least one mark corresponding to at least one selected from among a check pattern, a character pattern, and a letter.

4. The method of claim 3, further comprising forming a cutting part at one side of the card adjacent to one edge of the transparent film.

5. The method of claim 4, the identification number being printed on a number printing layer on the card.

6. A method, comprising:

forming a first adhesive layer between a front surface of a card and a rear surface of unit bearing a holographic image, the card bearing an identification number, the unit bearing the holographic image being adhered to the card to cover the identification number;

forming a removable tape separation handle at an edge of the card, the tape separation handle being connected to the card by a plurality of curved projections, the tape separation handle being removed from the card when the curved projections are cut; and forming an additional adhesive layer between a transparent film and a front surface of the unit bearing the holographic image, the adhesive layer adhering to and removing a part of the unit bearing the holographic image when the transparent film is at least partially separated from the unit bearing the holographic image.

7. The method of claim 6, the adhesive layer removing a central part of the unit bearing the holographic image when the transparent film is at least partially separated from the unit the holographic image.

8. A method, comprising:

applying an adhesive to a first portion of a film label and not applying the adhesive to a label separation handle portion of the film label;

attaching the first portion of the film label over a number printing layer on a card with the adhesive, the number printing layer bearing an identification number, the film label being substantially opaque to prevent viewing of the identification number through the film label, the film label having tooth-shaped regions on at least two edges of the film label; and attaching a unit bearing a holographic image over the film label, the unit having a first part attached to the film label and having a second part attached to the card, the second part extending beyond at least one edge of the film label, the second part being separated from the first part and having tooth-shaped edges when the film label is removed from the number printing layer.

9. The method of claim 8, further comprising securing a transparent film between the number printing layer and the film label.

10. A method, comprising:

forming a first handle at an edge of a card, the first handle being connected to the card by a plurality of projections, the first handle being removed from the card when the projections are cut;

attaching a film label to a card to cover a number printing layer on the card, the number printing layer bearing an identification number, the film label having a label separation section adjacent to the first handle and having a tooth portion adjacent to the number printing layer; and displaying at least one mark adjacent to the number printing layer at a location corresponding to the tooth portion when the film label is separated from the card.

11. The method of claim 10, said attaching being performed with an adhesive.

12. A method, comprising:

attaching a predetermined unit over a number printing layer on a card, the predetermined unit having an opaque layer adjacent to the number printing layer, the number printing layer bearing a true identification number, the opaque layer blocking viewing of the true identification number when the predetermined unit is attached on the card, the predetermined unit bearing a false identification number different from the true identification number; and attaching a portion bearing a holographic image over the predetermined unit, the portion bearing the holographic image having a first part attached to the predetermined unit and having a second part not attached to the predetermined unit, the second part extending beyond at least one edge of the predetermined unit, the second part being separated from the first part and having at least one jagged edge when the predetermined unit is separated from the card to access the true identification number.

13. The method of claim 12, the predetermined unit being a film label.

14. The method of claim 13, further comprising securing a transparent film between the number printing layer and the film label.

15. The method of claim 12, the predetermined unit being a silicon layer.

* * * * *